United States Patent
Harper et al.

(10) Patent No.: US 9,684,752 B2
(45) Date of Patent: Jun. 20, 2017

(54) AUTOMATING SYSTEM ON A CHIP CUSTOMIZED DESIGN INTEGRATION, SPECIFICATION, AND VERIFICATION THROUGH A SINGLE, INTEGRATED SERVICE

(71) Applicant: INTERNATIONAL BUSINESS MACHINES CORPORATION, Armonk, NY (US)

(72) Inventors: Jeffrey D. Harper, Austin, TX (US); Kalpesh Hira, Austin, TX (US); Giang Nguyen, Austin, TX (US); Bill N. On, Austin, TX (US); James M. Rakes, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/402,492

(22) Filed: Jan. 10, 2017

(65) Prior Publication Data
US 2017/0116355 A1   Apr. 27, 2017

Related U.S. Application Data

(63) Continuation of application No. 15/237,911, filed on Aug. 16, 2016, which is a continuation of application
(Continued)

(51) Int. Cl.
*G06F 17/50* (2006.01)
(52) U.S. Cl.
CPC .......... *G06F 17/505* (2013.01); *G06F 17/504* (2013.01); *G06F 17/5072* (2013.01); *G06F 17/5081* (2013.01)

(58) Field of Classification Search
USPC .......................... 716/102, 103, 104, 106, 108
See application file for complete search history.

(56) References Cited

U.S. PATENT DOCUMENTS

| 6,338,158 B1 | 1/2002 | Payne |
| 6,477,691 B1 | 11/2002 | Bergamashi/Rab et al. |

(Continued)

FOREIGN PATENT DOCUMENTS

| WO | 2004061602 A2 | 7/2004 |
| WO | 2005078465 | 8/2005 |
| WO | 2008093312 A1 | 8/2008 |

OTHER PUBLICATIONS

Chandra, Anshuman, et al; "System-on-a-chip test-data compression and decompression architectures based on Golomb codes." Computer-Aided Design of Integrated Circuits and Systems, IEEE Transactions on 20, No. 3 (2001): 355-368, 14 pages.
(Continued)

*Primary Examiner* — Brian Ngo
(74) *Attorney, Agent, or Firm* — Steven Meyers; Amy J. Pattillo

(57) ABSTRACT

A user specified high level design selects a plurality of IP cores for placement in a customized system on a chip. A single integrated service automatically performs each of a design integration phase, specification phase, and verification phase for the user specified high level design to generate an integration file specifying stitching between a plurality of pins of each of the plurality of IP cores, a specification file specifying one or more characteristics of the customized system on a chip based on the user specified high level design, and a verification testbench for verification of the user specified high level design.

17 Claims, 10 Drawing Sheets

Related U.S. Application Data

No. 14/737,291, filed on Jun. 11, 2015, now Pat. No. 9,477,807.

(56) References Cited

U.S. PATENT DOCUMENTS

| | | | |
|---|---|---|---|
| 6,513,146 B1 | 1/2003 | Yonezawa et al. | |
| 6,658,633 B2 | 12/2003 | Devins et al. | |
| 6,993,740 B1 | 1/2006 | Bergamaschi et al. | |
| 7,124,376 B2 | 10/2006 | Zaidi et al. | |
| 7,290,238 B2 | 10/2007 | Stauffer et al. | |
| 7,302,670 B2* | 11/2007 | Bowyer | G06F 17/5045 716/102 |
| 8,065,128 B1 | 11/2011 | Chase | |
| 8,639,487 B1 | 1/2014 | Ezer et al. | |
| 8,645,897 B1 | 2/2014 | Nandini et al. | |
| 8,732,632 B1 | 5/2014 | Keller et al. | |
| 9,477,807 B1 | 10/2016 | Harper et al. | |
| 2002/0038401 A1 | 3/2002 | Zaidi et al. | |
| 2002/0188910 A1* | 12/2002 | Zizzo | G06F 17/5045 716/103 |
| 2003/0009730 A1 | 1/2003 | Chen et al. | |
| 2003/0093764 A1 | 5/2003 | Devins et al. | |
| 2004/0098689 A1* | 5/2004 | Weed | G06F 17/50 716/102 |
| 2004/0128626 A1* | 7/2004 | Wingren | G06F 17/5045 716/102 |
| 2005/0240892 A1 | 10/2005 | Broberg, III et al. | |
| 2006/0271904 A1* | 11/2006 | Emerson | G01R 31/31704 716/111 |
| 2008/0104466 A1 | 5/2008 | Menon et al. | |
| 2008/0244491 A1* | 10/2008 | Ganesan | G06F 17/5031 716/100 |
| 2013/0268808 A1 | 10/2013 | Patil et al. | |
| 2016/0364506 A1 | 12/2016 | Harper et al. | |

OTHER PUBLICATIONS

Sgroi, Marco, et al; "Addressing the system-on-a-chip interconnect woes through communication-based design." In Design Automation Conference, 2001 Proceedings, pp. 667-672, 6 pages, IEEE, 2001.

Ravi, Srivaths, et al; "Testing of core-based systems-on-a-chip." Computer-Aided Design of Integrated Circuits and Systems, IEEE Transactions on 20, No. 3 (2001): 426-439, 14 pages.

Geist, Daniel et all, "A Methodology for the Verification of a system on chip", DAC 99, 1999 ACM 1-58113-109-7/99/06, 6 pages.

Atitallah, Rabie et al., "MPSoC Power Estimation Framework at Transaction Level Modeling", IEEE, International Conference on Microelectronics, 2007, ICM 2007, Cairo, INRIA-FUTURS, France, 4 pages.

Bergamaschi, Reinaldo A., et al., "Designing Systems-on-Chip Using Cores", 2000, 37th Design Automation Conference, 1-58113-188-7/00/0006, 6 pages.

Lipman, Jim, "Configurable SoCs Give You Options", EE Times, Nov. 30, 2000, accessed via the Internet from <http://www.eetimes.com/document.asp?doc_id=1275962> as of Mar. 16, 2015, 6 pages.

Devins, Robert, "SOC Verification Software—Test Operating System", accessed via the Internet from <http://www.eda.org/edps/edp01/PAPERS/devins.pdf> as of Mar. 16, 2015, 6 pages.

Elleouet, David et al., "A High Level SoC Power Estimation Based on IP Modeling", 20th International Parallel and Distributed Processing Symposium, 2006 IEEE, 4 pages.

Office Action, mailed Mar. 25, 2016, U.S. Appl. No. 14/737,291, filed Jun. 11, 2015, In re Harper, 20 pages.

Notice of Allowance, mailed Jul. 13, 2016,U.S. Appl. No. 14/737,291, filed Jun. 11, 2015, in re Harper, 19 pages.

Notice of Allowance, mailed Oct. 28, 2016,U.S. Appl. No. 15/237,911, filed Aug. 16, 2016, in re Harper, 37 pages.

"List of IBM Patents or Patent Applications Treated as Related", dated Jan. 10, 2017, 2 pages.

\* cited by examiner

AUTOMATING SYSTEM ON A CHIP CUSTOMIZED DESIGN INTEGRATION, SPECIFICATION, AND VERIFICATION THROUGH A SINGLE, INTEGRATED SERVICE

CROSS REFERENCE TO RELATED APPLICATIONS

This application is a continuation of commonly assigned U.S. patent application Ser. No. 15/237,911, filed Aug. 16, 2016, which is a continuation of U.S. patent application Ser. No. 14/737,291, filed Jun. 11, 2015, which are hereby incorporated herein by reference.

BACKGROUND

1. Technical Field

The embodiment of the invention relates generally to electronic integrated circuit design and particularly to automating system on a chip customized design integration, specification, and verification through a single, integrated service.

2. Description of the Related Art

A system on chip (SOC) is an integrated circuit that integrates components of a computer system or electronic system into a single integrated circuit, or chip. A SOC design often integrates multiple functional cores, such as multiple processor cores, into a chip that functions as a single chip.

BRIEF SUMMARY

There is a need for a method, system, and computer program product for automating SOC customized design integration, specification, and verification through a single, integrated service.

In one embodiment, a method is directed to a computer system receiving, by a single integrated service, a user specified high level design selecting a plurality of IP cores for placement in a customized system on a chip. The method is directed to the computer system automatically performing, by the single integrated service, each of a design integration phase, specification phase, and verification phase for the user specified high level design to generate an integration file specifying stitching between a plurality of pins of each of the plurality of IP cores, a specification file specifying one or more characteristics of the customized system on a chip based on the user specified high level design, and a verification testbench for verification of the plurality of IP cores specified in the user specified high level design. The method is directed to the computer system performing the integration phase by identifying, for each of the plurality of IP cores, a separate IP core component and at least one separate port. The method is directed to the computer system creating, for each separate IP core component, a separate real IP core component in a register transfer level design. The method is directed to the computer system identifying, for each at least one separate port, the plurality of pins each connected to the at least one separate port. The method is directed to the computer system mapping each pin of the plurality of pins into a separate real pin of a plurality of real pins within one of the separate real IP core component in the register transfer level design. The method is directed to the computer system identifying a selection of at least two real pins from among the plurality of design pins with a same property based on a separate property setting for each of the plurality of pins specified in a core wrappers database accessible to the single integrated service. The method is directed to the computer system selecting a separate connection of a plurality of connections between the selection of the at least one real pins with the same property to connect the plurality of IP cores. The method is directed to the computer system mapping each separate connection into the register transfer level design. The method is directed to the computer system generating the integration file with the register transfer level design specifying the stitching between the plurality of pins of each of the plurality of IP cores.

In another embodiment, a computer system comprising one or more processors, one or more computer-readable memories, one or more computer-readable storage devices, and program instructions, stored on at least one of the one or more storage devices for execution by at least one of the one or more processors via at least one of the one or more memories. The stored program instructions comprising program instructions to receive, by a single integrated service, a user specified high level design selecting a plurality of IP cores for placement in a customized system on a chip. The stored program instructions comprising program instructions to automatically perform, by the single integrated service, each of a design integration phase, specification phase, and verification phase for the user specified high level design to generate an integration file specifying stitching between a plurality of pins of each of the plurality of IP cores, a specification file specifying one or more characteristics of the customized system on a chip based on the user specified high level design, and a verification testbench for verification of the plurality of IP cores selected in the user specified high level design. The stored program instructions comprising program instructions to perform the integration phase by identifying, for each of the plurality of IP cores, a separate IP core component and at least one separate port. The stored program instructions comprising program instructions to create, for each separate IP core component, a separate real IP core component in a register transfer level design. The stored program instructions comprising program instructions to identify, for each at least one separate port, the plurality of pins each connected to the at least one separate port. The stored program instructions comprising program instructions to map each pin of the plurality of pins into a separate real pin of a plurality of real pins within one of the separate real IP core component in the register transfer level design. The stored program instructions comprising program instructions to identify a selection of at least two real pins from among the plurality of design pins with a same property based on a separate property setting for each of the plurality of pins specified in a core wrappers database accessible to the single integrated service. The stored program instructions comprising program instructions to select a separate connection of a plurality of connections between the selection of the at least one real pins with the same property to connect the plurality of IP cores. The stored program instructions comprising program instructions to map each separate connection into the register transfer level design. The stored program instructions comprising program instructions to generate the integration file with the register transfer level design specifying the stitching between the plurality of pins of each of the plurality of IP cores.

In another embodiment, a computer program product comprising one or more computer-readable storage devices and program instructions, stored on at least one of the one or more storage devices. The stored program instructions comprising program instructions to receive, by a single integrated service, a user specified high level design selecting a plurality of IP cores for placement in a customized system on a chip. The stored program instructions comprising program instructions to automatically perform, by the single integrated service, each of a design integration phase, specification phase, and verification phase for the user specified high level design to generate an integration file specifying stitching between a plurality of pins of each of the plurality of IP cores, a specification file specifying one or more characteristics of the customized system on a chip based on the user specified high level design, and a verification testbench for verification of the plurality of IP cores selected in the user specified high level design. The stored program instructions comprising program instructions to perform the integration phase by identifying, for each of the plurality of IP cores, a separate IP core component and at least one separate port. The stored program instructions comprising program instructions to create, for each separate IP core component, a separate real IP core component in a register transfer level design. The stored program instructions comprising program instructions to identify, for each at least one separate port, the plurality of pins each connected to the at least one separate port. The stored program instructions comprising program instructions to map each pin of the plurality of pins into a separate real pin of a plurality of real pins within one of the separate real IP core component in the register transfer level design. The stored program instructions comprising program instructions to identify a selection of at least two real pins from among the plurality of design pins with a same property based on a separate property setting for each of the plurality of pins specified in a core wrappers database accessible to the single integrated service. The stored program instructions comprising program instructions to select a separate connection of a plurality of connections between the selection of the at least one real pins with the same property to connect the plurality of IP cores. The stored program instructions comprising program instructions to map each separate connection into the register transfer level design. The stored program instructions comprising program instructions to generate the integration file with the register transfer level design specifying the stitching between the plurality of pins of each of the plurality of IP cores.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
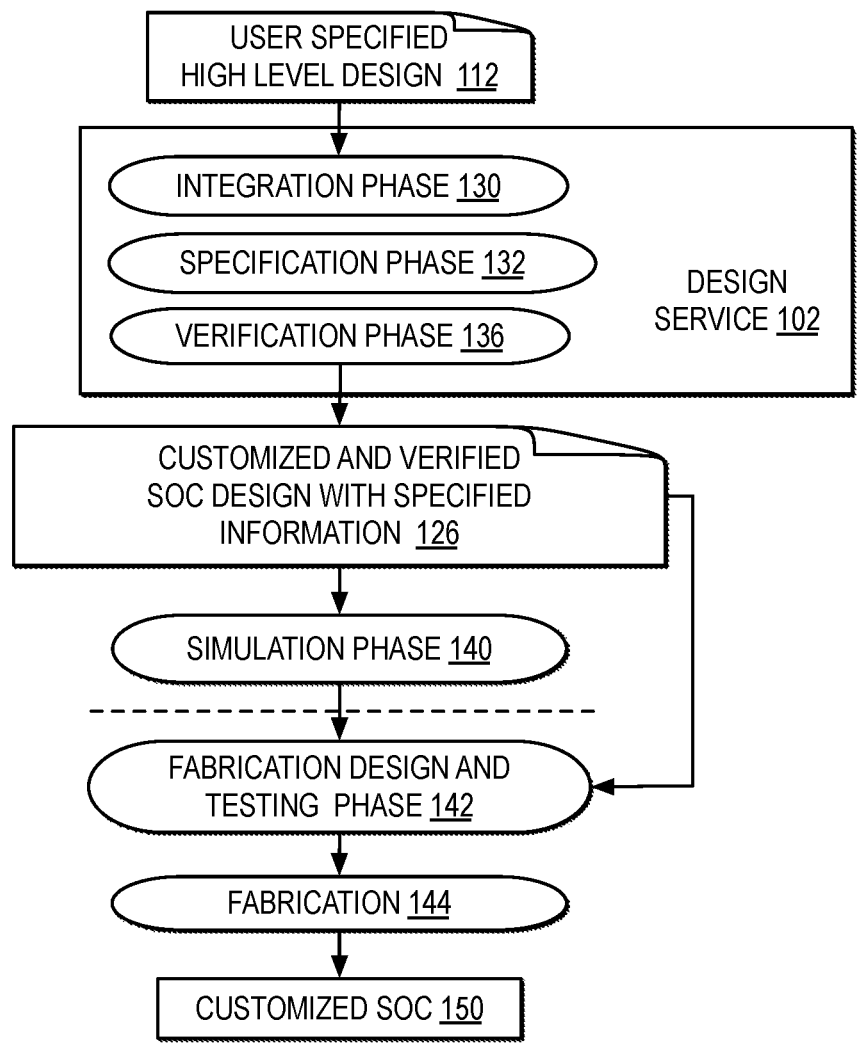
FIG. 1 illustrates one example of a block diagram of one or more design and manufacturing phases for producing a customized SOC based on a user specified high level design.

FIG. 1 illustrates a block diagram of one example of one or more design and manufacturing phases for producing a customized SOC based on a user specified high level design.

In one example, a user may specify a high level design request for a customized SOC, illustrated by a user specified high level design 112. In one example, user specified high level design 112 provides a high level specification of intellectual property (IP) cores and port specifications for a customized SOC design. In one example, an IP core, or IP block, may represent a virtual instance of a real, preconfigured IP core component that may be fabricated into a SOC. In addition, an IP core may represent a reusable virtual block of logic, cell, or chip layout design data that represents a real block of logic or data to be used in producing a field programmable gate array (FPGA) logic designs or application-specific integrated circuit (ASIC) chip designs for production within a SOC. In one example, user specified high level design 112 may specify an ASIC chip design for a particular customer.

In one example, an IP core may represent a preconfigured, tested, and verified, unit of logic, cell or chip layout design that easily reusable within multiple SOC designs and are proprietary to a particular entity. In one example, an IP core may be licensed by or offered by one or more parties to one or more other parties for use across one or more customized SOC designs. In one example, a party that designs an IP core may provide an IP core library with one or more files that specify the IP core in a format referred to as a soft IP core or a hard IP core. In one example, a soft IP core may include a chip design defined by synthesizable RTL, delivered in a hardware description language (HDL) such as Verilog or VHDL, and a netlist of the logic gates and associated interconnections of an integrated circuit. In one example, a hard IP core may include a chip design defined by a lower level, physical description. In one example, each IP core specified in user specified high level design 112 may include a reference to an IP library that includes the design specifications of a virtual instance of a real IP core component for the IP core. In another example, user specified high level design 112 may include the design specifications for a virtual instance of a real IP core component for one or more IP cores. In one example, using IP cores for a customized chip design may allow a user to select IP core designs that have already been integrated and tested, and may be easily inserted into a customized SOC design without requiring that the user separately test and verify each IP core design.

In addition, in specifying user specified high level design 112, the IP cores selected by a user may include different types of IP cores, including, but not limited to, processor, system, and peripheral cores. In addition, user specified high level design 112 may include specifications for additional, reusable types of components, such as a bus infrastructure. In one example, a CoreConnect (CoreConnect is a trademark of International Business Machines Corporation) bus infrastructure is an example of a microprocessor-bus architecture that may be specified by a user in user specified high level design 112, where the microprocessor-bus architecture is a licensable pre-designed and tested architecture and provides elements of a processor local bus (PLB), on-chip peripheral bus (OPB), a bus bridge, and a device control register (DCR) bus for SOC design. In one example, the CoreConnect bus infrastructure enables integration and reuse of IP cores.

In one example, a user requests to receive a manufactured, customized SOC 150, based on user specified high level design 112. While the individual IP cores specified in user specified high level design 112 may refer to existing IP cores that have been tested and verified, and while user specified high level design 112 may refer to ports to which IP cores should be connected, generating a customized SOC design with a selection of one or more preconfigured IP cores, which is testable and manufacturable, may require more than merely placing IP cores onto a design map. In addition, user specified high level design 112 may not include a customized specification of all the interconnections between IP cores and other components of the SOC, may not include verification testcases for testing the customized SOC at the design and fabrication stages, and may not include customized information required for programming and use of customized SOC 150.

In one example, customized SOC 150 may represent a manufactured integrated circuit that includes one or more functional cores and additional components integrated on a single chip and functional together as a computer system. In another example, customized SOC 150 may also represent an integrated circuit that comprises a number of chips in a single package, where dies containing integrated circuits may be stacked on a substrate to manufacture the package. In one example, customized SOC 150 may be customized for placement on a printed circuit board (PCB) and for connection to one or more external devices. In one example, functional cores of customized SOC 150 may include, but are not limited to, processor cores, memory cores, and other types of functional cores. In one example, additional components may include, but are not limited to, additional processor cores, memory controllers, memory cores, interface units, analog control units, networking channels, such as Ethernet, I/O channels, such as Peripheral Component Interconnect (PCI) express, interfaces, voltage regulators, power management circuits, and one or more buses running between one or more elements on customized SOC 150, along with bus control units.

In one example, for customized SOC 150 to be manufactured, based on user specified high level design 112, one or more design and fabrication phases are required. Minimizing the time to market time, from the time when user specified high level design 112 is specified and provided for design to the time when customized SOC 150 is ready to be sent on the market, may be a goal for entities that provide one or more of the design and fabrication phases for generating customized SOC 150. In addition, minimizing the number of entities required to participate in the time to market for customized SOC may be a goal for customers who want increased security maintaining a proprietary design for customized SOC 150. In one example, design phases may include, but are not limited to, an integration phase 130, an information specification phase 132, and a verification phase 136, to generate a customized and verified SOC design 126 with customized, specified information required for use, which is then tested through a simulation phase 140. In one example, fabrication phases may include, but are not limited to, a fabrication design and testing phase 142, which may include generating a fabrication design that specifies the composition and layers of a substrate and testing the fabrication design, which precedes a fabrication phase 144, to control fabrication of a substrate to produce customized SOC 150.

For example, an integration phase 130 may represent a phase for specifying which pins of each IP core to connect to one another and generating an RTL mapping specifying the stitching for connecting each of the IP cores to one another. A specification phase 132 may represent a phase for collecting information about the IP cores of the customized SOC that may be required for programming and use of customized SOC 150, such as, but not limited to, bandwidth thresholds, power analysis, and registers, I/O, and memory information for the IP cores. In addition, a verification phase 136 may represent a phase for determining one or more testcases specified for testing the customized selection of IP cores in user specified high level design 112. In one example, the result of integration phase 130 and verification phase 136 may include a customized and verified SOC design with specified information 126.

In one example, where one or more of integration phase 130, specification phase 132, and verification phase 136 are performed manually, by an engineer performing the steps for the phase, the design time required for each design phase may significantly increase as the number of IP cores included in user specified high level design 112 increases and as the complexity of the IP cores selected increases. For example, each IP core block may include hundreds of pins where a user attempting to connect each of the hundreds of pins may also need to consider additional parameters for each IP core including, but not limited to, the memory maps for each IP core, the documentation for each IP core, the test operating system, and external memories and I/O device models, which may require a significant amount of time and effort. In addition, each IP block may include multiple revisions, where a user manually collecting specification information about even one IP block may include manually collecting information about multiple revisions to the IP block. In addition, where integration phase 130 and verification phase 136 are performed by different entities or engineers, the design time required for different entities or engineers to separately review user specified high level design 112 and perform each of the phases, may significantly impact the total design time, within the time to market timeline, and may lead to undetected errors.

In one example, as the time to market needs of users to quickly and effectively produce customized SOC 150 decrease, the amount of manual performance required at each of the integration phase, the verification phase, and the collection of required information about the customized SOC increases the amount of time required before starting the next phases of SOC production, including simulation and analysis of the SOC. In addition, as the time to market needs of users to quickly and effectively produce customized SOC 150 decrease, the number of users and entities required to perform each of the integration phase, the verification phase, and the collection of required information about the customized SOC increases the amount of time required before starting the next phases of SOC production, including simulation and analysis of the SOC. In addition, with the complexity of analysis and selections that need to be performed during integration phase 130, specification phase 132, and verification phase 136, these phases can be prone to errors when performed manually, where the errors may not be detected until a later phase, which may require restarting the design phases to correct the error, increasing the cost of the design phase. For example, a human may connect cores to a bus during integration phase 130, assuming that the bus is a 32 bit bus, however, if the bus is actually a 36 bit bus, the error may not be caught until a later phase, which will trigger additional time and cost to perform integration phase 130, again to correct the error. In addition, when multiple components are put together in an SOC, there are emergent properties that may not be present for the components separately, which may not be detected if each phase is performed separately, and which may introduce errors or diminish performance of the SOC.

In one embodiment of the invention, integration phase 130, specification phase 132, and verification phase 136 are automated and integrated into a single, integrated design service 102 that receives user specified high level design 112, automatically applies one or more databases of collected information and testcases, and delivers customized and verified SOC design with specified information 126, to minimize the time required to perform integration phase 130, specification phase 132, and verification phase 136. In addition, by integrating integration phase 130, specification phase 132, and verification phase 136 into single integrated design service 102, automation of each of these phases by a single service improves the accuracy of the connections selected and mapped by integration phase 130, the specification information collected by specification phase 132, and the verification testbenches generated by verification phase 136. In one example, while single, integrated design service 102 may require some manual, user entry during one or more of integration phase 130, specification phase 132, and verification phase 136, the amount of manual, user entry is minimized and the primary, time consuming, complex tasks are automated and performed by single integrated design service 102.

Figure 2:
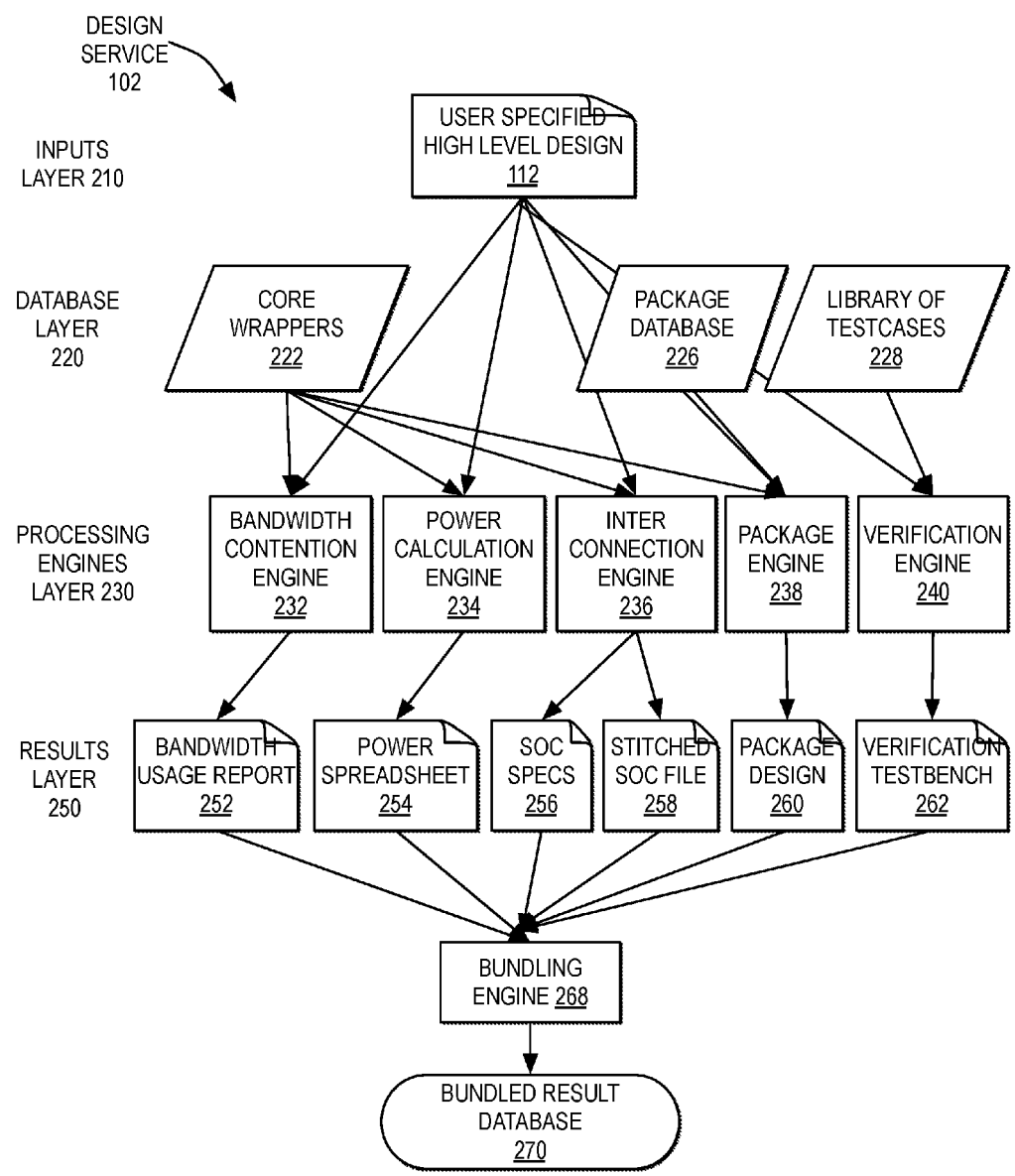
FIG. 2 illustrates one example of a block diagram of a single, integrated design service for automating SOC customized design integration, specification, and verification.

FIG. 2 illustrates a block diagram of one example of a single, integrated design service for automating SOC customized design integration, specification, and verification.

In one example, an integrated design service 102 may represent an electronic design automation (EDA) system that includes an inputs layer 210 through which one or more types of data are received as input. In one example, inputs layer 210 may include user specified high level design 112. In one example, user specified high level design 112 may specify selections of one or more IP cores for placement in a customized SOC design and port specifications. In one example, an IP core component may represent a virtual instance of a real IP core component to be instantiated in the produced design. In one example, each IP core specified in user specified high level design may specify a particular IP library including a specification of the IP core. In addition, user specified high level design 112 may include entries retrieved from one or more IP libraries within the specification. In addition, IP library elements may be separately passed as inputs in inputs layer 210.

In one example, integrated design service 102 may include a database layer 220 within which one or more databases, from one or more entities, organized in one or more types of database management systems, are integrated into database layer 220 for access within integrated design service 102. In one example, database layer 220 may include all or most of the data required for performing the integration phase, specification phase, and verification phase, organized in database layer 220 for access by one or more engines within a processing engines layer 230. In one example, one or more interfaces may be specified to enable integration of one or more of the databases into database layer 220. In one example, the data within each of the databases in database layer 220 may include databases that are provided by one or more entities and integrated into database layer 220 for use by integrated design service 102.

In one example, one or more databases integrated into database layer 220 may include, but are not limited to, a core wrappers database 222, a package database 226, and a library of testcases database 228. In additional or alternate examples, database layer 220 may include additional or alternate databases.

In one example, core wrappers database 222 may include metadata that encapsulates all the glue logic required by one or more selected IP cores. In one example, glue logic may refer to custom logic circuitry used as interfaces for pins of each IP core. In one example, by including the glue logic required by one or more selected IP cores within core wrappers database 222, no additional glue logic needs to be generated by engines within processing engines layer 230 and no additional glue logic needs to be inserted by a user. In one example, the glue logic specified in core wrappers database 222 may include properties associated with each core and with each pin. In one example, properties are attached as attributes onto the data records for cores and pins in core wrappers database 222 and users may specify any property type and values and associated the defined property type with any pin. For example, a user may specify a single property definition of "P={Property_type=Property_value}". Examples of properties that may be assigned as property values include, but are not limited to, PLB, master, indicator, and Bus_Request.

In another example, glue logic in core wrappers database 222 may include additional types of characteristics of pins and may specify what each pin may connect to. For example, a characteristic of a reset pin in a core wrapper may specify the polarity of one or more reset pins for an IP core. In one example, the polarity of a reset pin may be set to active high or active low. In one example, when selecting the interconnections between pins and connections to the IP cores, connecting the reset pins with the correct polarity is necessary to be able to send a reset signal that will reset all the IP cores.

In addition, core wrappers database 222 may include XML data that provides specification information for each IP core. XML data may include specifications of an IP core for each revision of the IP core. XML data may include identifiers for the registers, memory, and I/O and other physical component characteristics for each IP core required for programming and use of each IP core. XML data may include specifications of hard IP core contents and soft IP core contents. XML data may specify the number of gates and connection densities of each IP core. In another example, XML data may include bandwidth characteristics, such as typical and peak bandwidths, and power characteristics of each IP core. In additional or alternate embodiments, core wrappers database 222 may include specification information for each IP core in additional or alternate languages and may include additional or alternate types of data.

In one example, package database 226 may include descriptions of one or more types of existing packages, may include die and module cost tables with costs based on die size and package size, may include rules for placing pins, connecting pins, and placing IP cores within the package designs. In one example, package database 226 may include specifications for one or more preexisting package designs that may be selected from, with rules for placing pins and IP cores, to minimize the amount of design and testing required for generating a package design for the customized SOC. In one example, package database 226 may include rules for placing pins that specify a maximum length of pin connections, to avoid pins lengths that are too long and may introduce crosstalk. In one example, mapping specifications for package designs may change frequently and package database 226 may be updated frequently with package design revisions. By maintaining current mapping specifications for package designs in package database 226, design service 102 is able to apply current mapping specifications for package designs when generating package recommendations. In one example, mapping specifications for preexisting packages may be proprietary and only accessible to the entity that produces the mapping specifications and its licensees, where design service 102 may provide the additional service of specifying one or more mapping specifications from package database 226 for use in manufacturing user specified high level design 112.

In one example, library of testcases database 228 includes one or more selections of testcases for use in verification of one or more IP cores. In one example, testcases database 228 may include different types and formats of testcases. In addition, testcases database 228 may include testcases from which additional modules may be launched and which are customizable. Library of testcases database 228 may include testscases for multiple types of IP cores accumulated from one or more sources. In one example, library of testcases database 228 includes testcases specified for use in simulation phase 140 by existing HDL based simulation modules, and may be self-checking.

In one example, integrated design service 102 may include a processing engines layer 130 within which one or more engines, from one or more entities, are integrated into processing engines layer 230 for automating system on a chip customized design integration, specification, and verification, within integrated design service 102. In one example, one or more interfaces may be specified to enable integration of one or more of the processing engines into processing engines layer 230 for use within integrated design service 102.

In one example, one or more engines integrated into processing engines layer 230 may include, but are not limited to, a bandwidth contention engine 232, a power calculation engine 234, an interconnection engine 236, a package engine 238, and a verification engine 240. In one example, integrated design service 102 may include a results layer 250 including separate outputs by one or more of the engines of processing engines layer 230. In one example, results layer 250 may include a bandwidth usage report 252 output by bandwidth contention engine 232, a power spreadsheet 254 output by power calculation engine 234, SOC specifications (SPECS) 256 and a stitched SOC file 258 output by interconnection engine 236, a package design 260 output by package engine 238, and a verification testbench 262 output by verification engine 240. In one example, integration phase 130 may include running interconnection engine 236, specification phase 132 may include running one or more of bandwidth contention engine 232, power calculation engine 234, interconnection engine 236, and package engine 238, and a verification phase 136 may include running verification engine 240.

In one example, bandwidth contention engine 232 may analyze one or more bandwidth factors for each of the IP cores specified in user specified high level design 112 and output bandwidth usage report 252 with specification information for programming and use of customized SOC 150. In one example, bandwidth contention engine 232 may access bandwidth characteristics of each IP core from XML date in core wrappers database 222 and compute a total typical bandwidth and total peak bandwidth for each of the IP cores. In addition, bandwidth contention engine 232 may determine whether the total typical bandwidth exceeds a total maximum bandwidth, and if so, set a flag for typical usage, and may determine whether the total peak bandwidth exceeds a peak maximum bandwidth, and if so, set a flag for peak usage. In one example, the bus and other fabric of the SOC has a total maximum bandwidth and a total peak bandwidth, where the sum of the usage of the total typical bandwidth and total peak bandwidths and determine whether the IP core bandwidth calculations exceed the bus total maximum bandwidth and total peak bandwidth. In addition, bandwidth contention engine 232 may collect and output additional or alternate specification information indicating the bandwidth parameters of individual IP cores and the SOC as a whole.

In one example, power calculation engine 234 may collect and analyze power related data for each of the IP cores specified in user specified high level design 112, estimate power usage factors for customized SOC 150 based on the power related data, and output power spreadsheet 254 with estimated power usage factors for programming and use of customized SOC 150. In one example, power calculation engine 234 accesses XML data from core wrappers database 222 that provides information about the gates, registers and laches, and I/O for each IP core, along with low level harder IP contents, and power calculation engine 234 calculates a combination gate count, registers and laches count, and I/O count for each IP core. In one example, power calculation engine 234 may calculate counts by summing the gates, registers and laches, and I/Os specified for each of the cores. Power calculation engine 234 may access a power budget, based on wattage and frequency, specified in user specified high level design 112. Power calculation engine 234 may estimate frequency, voltage, activity factors and switch factors for power usage for each IP core based on the accessed and calculated data. In addition, power calculation engine 234 may compute a dynamic power and leakage power, based on the determined factors, and sum a total power usage from the dynamic power and leakage power usage. For example, power calculation engine 234 may estimate dynamic power based on switching and leakage power based on the number of gates, which is determined from the number of cores. Power calculation engine 234 may output power spreadsheet 254 with the factors, computed power values, and additional or alternate types of information collected, analyzed, and computed for each IP core and for the SOC as a whole. In one example, the specification information in power spreadsheet 254 may be required for plugging customized SOC 150 into a board, for shipping customized SOC 150, and for directing usage of customized SOC 150.

In one example, interconnection engine 236 may access user specified high level design 112, determine the selection of IP cores specified in user specified high level design 112, access a selection of properties metadata for each IP core in core wrappers database 222, select connections between pins with matching properties, map the IP cores into a correct-by-construction design using preexisting virtual cores and explicit interconnections, and output the construction design and explicit interconnections as SOC specifications 256 and stitched SOC file 258.

In particular, in one example, interconnection engine 236 may access the properties associated with each core and each pin the core from metadata for each IP core in core wrappers database 222 and select the interconnections for stitching the cores together by matching the properties on the pins of cores to one another. For example, interconnection engine 236 may determine, based on properties of pins and cores within core wrappers database 222, that a pin "DCU_plb_Request" on a PowerPC core may connect with a pin "M1_request" on a PLB Arbiter core because both pins contain the properties of "PLB, Master, Indicator, Bus_request" specified in a property attribute attached to each pin definition in metadata within core wrappers database 222.

In one example, interconnection engine 236 may integrate a spec-to-RTL mapping engine that maps the IP cores specified in user specified high level design 112 into a correct-by-construction design using preexisting virtual cores and explicit interconnections by selecting which pins in different cores should be connected together based on matching pin properties to one another. In particular, in one example, interconnection engine 236 may read user specified high level design 112, creates corresponding real IP core components in an RTL design, and for each port of the real IP core components in the RTL design, finds the pins connected to it, maps each pin into real pins, and connects real pins with matching properties, where stitched SOC file 258 includes the RTL design. In one example, an RTL design is lower level, and therefore more accurate for use in simulation phase 140, than a C based model of the cores.

In addition, interconnection engine 236, based on reset pin polarity information from core wrappers 222, may specify the mapping of reset pins of each of the IP cores specified in user specified high level design 112 to enable reset of all the IP cores and may specify the reset pin polarity in SOC specifications 256. In one example, if reset pins are not mapped according to the polarity of each pin, to enable a single signal to reset all the cores, and one IP core requires an active high to reset and another core an active low to reset, the difference could keep all the cores from resetting.

In one example, the number of combinations and permutations for connecting each pin to another pin within user specified high level design 112 exponentially increases for each pin of each IP core in the user specified high level design 112. Interconnection engine 236 is able to quickly analyze and consider all the possible combinations and permutations, along with characteristics of pins, such as reset pin polarity, and select a best selection to meet additional design factors. While a human could potentially consider all possible combinations and permutations, along with considering the characteristics of different pins, the time required for a human to consider hundreds or thousands of connection options for each pin of each IP core would be incredibly time consuming and prone to error. In addition, pin connection errors, such as reset pin polarity errors, may not necessarily be detected during the verification phase 136, and may not become apparent until simulation phase 140. According to an embodiment of the invention, interconnection engine 236 selects connections between pins and maps the stitching for the SOC into stitched SOC file 238 in a manner that is consistent with the IP core specifications that are also used by verification engine 240 to generate verification testbench 262, to minimize the amount of time required to determine stitched SOC file 258 and minimize any errors.

In one example, interconnection engine 236 may use XML information for each IP core accessed from core wrappers database 222 to access and generate a list of one or more of the I/O signals, interrupt assignments, device control register maps, system memory maps, and descriptions of each core, including the registers of all the cores specified in user specified high level design 112, into one, complete document identified as SOC specifications 256. In addition, interconnection engine 236 may use user specified high level design 112 and XML information for each IP core accessed from core wrappers database 222 to compile a list of the most up to date specifications for each IP core specified in user specified high level design 112 and outputs the list in SOC specifications 256. SOC specifications 256 may include the addresses of memory components, for use by a programming for programming use of customized SOC 150. In one example, a user, in user specified high level design 112, may specify the addresses of memory components. In addition, in generating SOC specifications 256, interconnection engine 236 may apply rules for specifying the types and order of information, including but not limited to, a table of contents, a header and a footer, an I/O signal list, interrupt assignments, a device control register map, a system memory map, a place holder for a block diagram, a core list complete with references and features for every core, labeled figures and tables, and new pages for each new top level header. In addition, SOC specifications 256 in general include information that indicates what the actual design of customized SOC 150 is, such that a user may review SOC specifications 256 to determine whether it complies with user specified high level design 112. In additional or alternate embodiments, interconnections engine 236 may collect, analyze and output additional information about each IP core and about the SOC as a whole in SOC specifications 256.

In one example, package engine 238 may access one or more types of physical component information about the IP cores specified in user specified high level design 112 from XML information about each of the IP cores in core wrappers database 222, determine IP core physical sizes based on the accessed information, compute a die size for each of the IP cores, select one or more packages from package database 226, develop a paper floorplan for positioning pins and IP cores on one of the selected packages using the mapping specifications for the selected packages, compute a package size, compute a compute a module cost, based on the die size and package size, and output a package design with the paper floorplan, die size, package size, module cost, and additional or alternate specifications for the package for the customized SOC. In one example, package engine 238 may access one or more specifications for computing die sizes, package sizes, and module costs from package database 226. In one example, package engine 238 may determine the number of gates for the IP cores specified in user specified high level design 112 from core wrappers database 222, and along with the connection density, compute the package size, without needing SOC specifications 256 or stitched SOC file 258. In one example, a user may not normally have access to mapping specifications of package designs for mapping IP cores to the package without first acquiring a license. In one example, package engine 238 may access package database 226, which includes multiple licensable package designs, and select a best package for user defined high level design 112, where the best package design is specified in package design 260, to automate and minimize the licensing requirements for selecting and mapping the IP cores of user defined high level design 112 to a package. In addition, in one example, while a user who acquires the mapping specifications for a package may manually place pins and IP cores in a package design, manual placement of thousands of pins and multiple IP cores is prone to error. In contrast, package engine 238 may apply many types of mapping specification rules to determine possible placements of pins and IP cores and to select best placements, which will not introduce cross talk or other issues into the package design.

In one example, verification engine 240 may access user specified high level design 112, determine the selection of IP cores specified in user specified high level design 112, determines a selection of testcases from among library of testcases 228 applicable for the selection of IP cores for verifying the SOC and specifying the selection of testcases for use in simulation phase 140 and fabrication design and testing phase 142, in one or more of a verification testsuite and verification testbench 262. In one example, specifying the selection of testcases may include specifying the selection of testcases as a testbench with appropriate external models for the external memories and I/O devices specified in user specified high level design 112 and a verification testsuite, and outputting the selection of testcases specified for user specified as a verification testbench 262. In one example, verification testbench 262 may represent a hardware description language (HDL) testbench that includes, but is not limited to, testing infrastructure for instantiations of external verification modules for testing the cores and additional components of the SOC, such as dynamic memory, static memory, serial and parallel communication interfaces, synchronous interfaces, and asynchronous interfaces. In one example, customized clock and reset generation in verification testbench 262 may provide the needed stimulus for the SOC when under test. In one example, verification testbench 262 is compatible with one or more of a Testing Operating System (TOS) and a Simple Test Environment (STE). In one example, TOS and STE represent operating environments for verifying SOCs. In one example, the primary interface to the design for performing verification testbench 262 may be through an I/O interface of the SOC. In one example, verification engine 240 may also generate supporting verification software within verification testbench 262. In one example, software needed to run HDL verification tests may be constructed from user defined parameters in testcases using object oriented constructs, such as C/C++, that interface with bus functional models or cycle accurate models to generate needed stimulus of the design. In particular, the bus architecture selected in user specified high level design 112 may represent a reusable bus architecture, such as CoreConnect, with existing bus functional models that can be used to test cores by stimulating I/O interfaces such as the DCR I/O, where DCR may represent a bus specified for a particular bus architecture, such as CoreConnect, to allow a CPU to read and write to control registers inside various cores. In one example, where verification testbench 262 runs on existing modules, and is self-checking, if the testbench passes, it is ok, but if the testbench does not pass, human intervention may be required. In one example, verification testbench 262 includes actual testcases, not random, where the use of the actual testcases produces results that are more realistic than if random numbers are generated and used for testing.

In one example, verification testbench 262 may include a document that is formatted according to one or more rules that specify the type and order of contents, including, but not limited to, a table of contents, descriptions of each IP core, descriptions of the tests required for each IP core, test philosophy, test measurements, work in progress, verification scope and methodology, and headers for verification scope, methodology, and a block diagram. In addition, verification testbench 262 may include the document formatted according to one or more rules that specify additional analysis and style, including, but not limited to, color coding the listing of all the different tests by IP core, positions marked to later add input of whether each of the different tests pass or fail and the timeline, and a complete table with all the tests for all the cores in the chip.

In one example, verification engine 240 may also perform a feasibility determination. In particular, a user may specify a significant number of cores within user specified high level design 112, however, if the infrastructure is not sufficient to support the number of cores selected, some cores may not be serviced each cycle or may be starved. In one example, a feasibility determination may include a determination of whether quality of service is feasible for the number of cores placed in user specified high level design 112. In one example, the feasibility determination may be performed by computing, during a single cycle, what each core is doing, to determine if all cores have been serviced and are not starved. In one example, the results of the feasibility determination may be output with to verification testbench 262.

In one example, results layer 150 may also implement a bundling engine 168 that receives the multiple outputs from processing engines layer 140 and bundles the multiple outputs into a bundled result database 170. In one example, bundling engine 168 may apply one or more formatting rules for conforming results from different types of engines into a particular format for storage.

In one example, an entity that runs design service 102 and generates bundled result database 170 may select whether and how to distribute the results. In one example, an entity may select to run design service 102 as a service to customers who have requested that the entity manufacture the customized SOC, where the entity secures bundled results database 170 internally and only allows access to bundled results database 170 to internally authorized control systems and users of the entity. In another example, an entity may select to run design service 102 and then provide bundled result database 170 to another one or more entities that are able to run simulation phase 140 and the fabrication phases.

Figure 3:
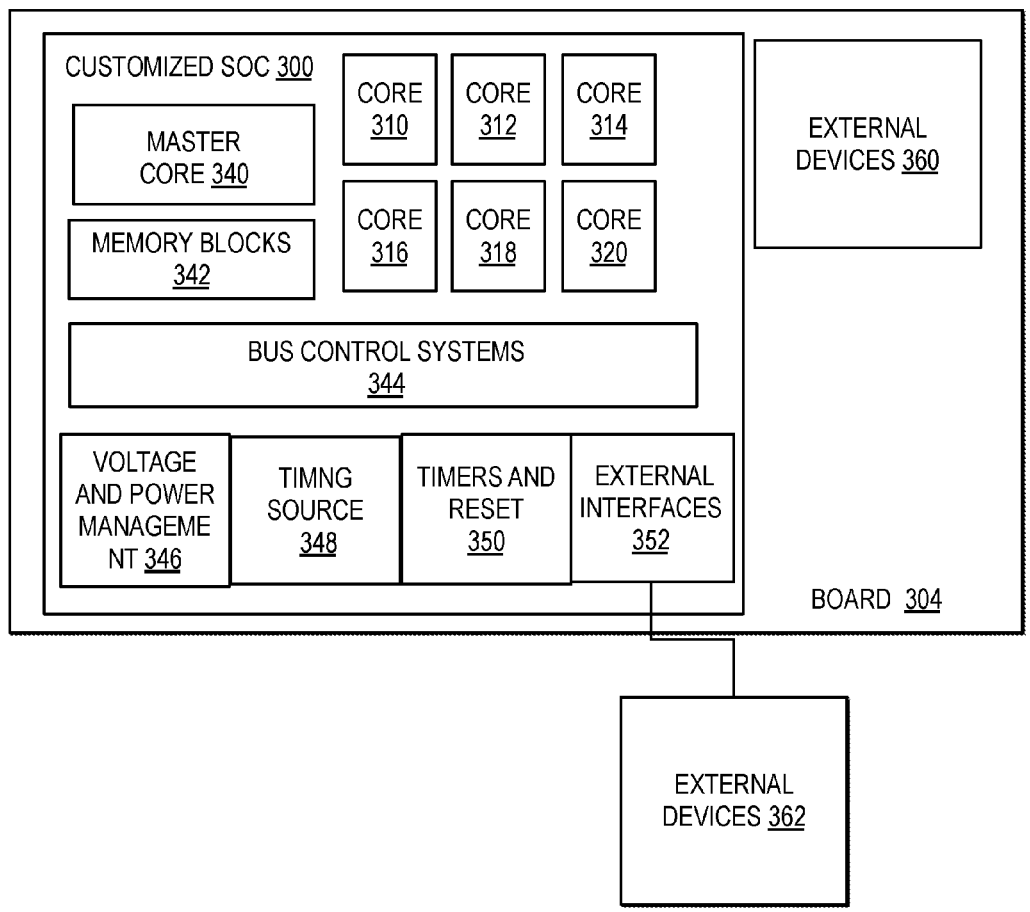
FIG. 3 illustrates one example of a block diagram of a component level view of a multiple core, customized SOC, that may access one or more external devices on board or off board.

FIG. 3 illustrates a block diagram of one example of a component level view of a multiple core, customized SOC that may access one or more external devices on board or off board.

In one example, a customized SOC 300 may represent a component level view of customized SOC 150. In one example, customized SOC 300 may include multiple functional cores illustrated as core 310, core 312, core 314, core 316, core 318, and core 320, where each of the cores represent a real IP core selected by virtual IP cores specified in user specified high level design 112. In one example, one or more of core 310, core 312, core 314, core 316, core 318, and core 320 may represent homogenous cores, all of a same type and having the same power requirements, frequency settings, and other functional characteristics. In another example, one or more of core 310, core 312, core 314, core 316, core 318, and core 320 may represent heterogeneous cores, each of one or more different types, having one or more different power requirements, one or more different frequency settings, or one or more different functional characteristics. In one example, bandwidth usage report 252, power spreadsheet 254, and SOC specifications 256 may provide the specification information required for a user to program and use customized SOC 300, for the specific power requirements, frequency settings, and other functional characteristics of customized SOC 300.

In one example, SOC 300 may include one or more additional cores specified as a master core, such as master core 340. In one example, one or more of core 310, core 312, core 314, core 316, core 318, and core 320 may also function as the master core. In one example, the master core may be distinguished from the other cores in that the other cores may execute applications and the master core may not execute applications, but may function as a hypervisor, or virtual machine monitor, that provides the software, hardware, and firmware to create and run virtual machines and other virtual resources. In another example, the master core may be distinguished as being authorized, by a hardware setting within customized SOC 300, to operate as the master core.

In one example, SOC 300 may include additional components that may be selected in user specified high level design 112 or in a base SOC design applied for user specified high level design 112. In one example, additional components may include, but are not limited to, one or more memory blocks 342, which may include a selection of one or more types of memory, such as dynamic memory (DDR) and static memory (SRAM). In addition, additional components of customized SOC 300 may include bus control systems 344 for managing buses running between one or more elements on customized SOC 300, voltage regulators and power management circuits 346, one or more timing sources 348, such as oscillators or phase-locked loops, timers and reset units 350, such as counter-timers, real-time timers, and power-on resent generators and analog interfaces. In addition, the additional components may include one or more types of external interfaces 352, including, but not limited to, serial and parallel communication interfaces, synchronous interfaces, and asynchronous interfaces. In one example, serial and parallel communication interfaces may include, but are not limited to PCIX, PCIE, and USB. In one example, synchronous interfaces may include, but are not limited to SPI interfaces. In one example, asynchronous interfaces may include, but are not limited to, UART interfaces.

In one example, customized SOC 300 buses and controllers, such as bus control system 344 and external interfaces 352, may connect and manage accesses by cores within customized SOC 300 to one or more types of external devices, such as external devices 360 on board 304 with customized SOC 300, and external devices 362, off board from board 304. In one example, accesses to external devices 360 or external devices 362 may include memory access requests to external devices. In one example, in one example, bus control systems 344 may implement one or more bus architectures and may include one or more controllers positioned on the buses including, but not limited to, bridges, arbiters, memory control units, and bus control units.

In one example, each of customized SOC 300 may represent one or more layers of integrated circuits, stitched together, on top of a substrate. In one example, customized SOC 300 may be manufactured as a package that may be connected to or manufactured onto board 304. In one example, board 304 may represent a PCB.

Figure 4:
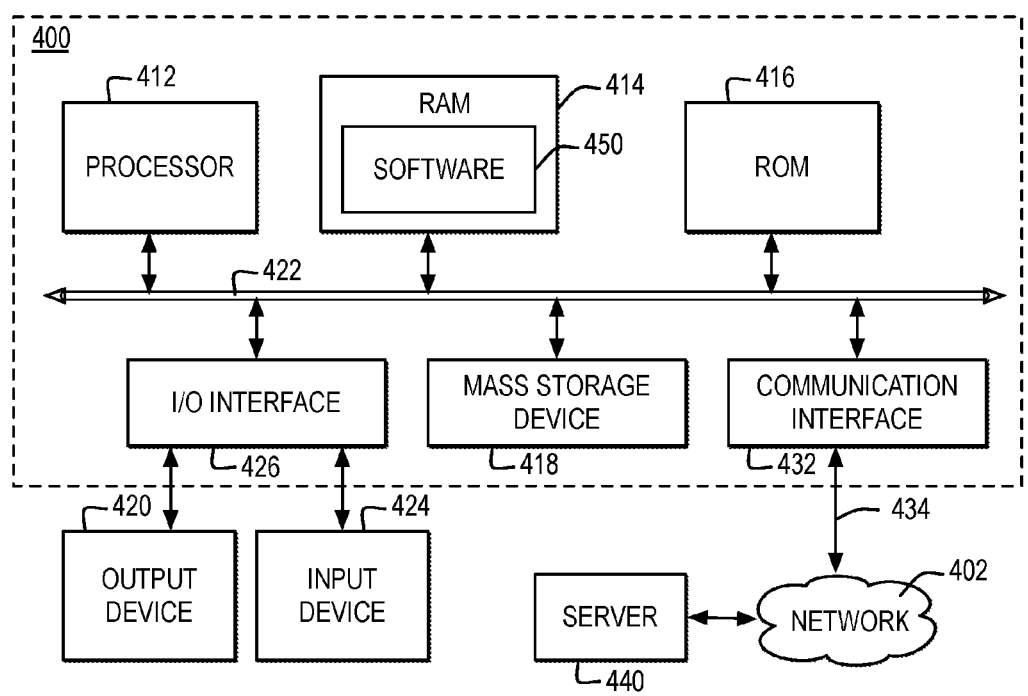
FIG. 4 illustrates one example of a block diagram a computer system in which one embodiment of the invention may be implemented.

FIG. 4 illustrates a block diagram of one example of a computer system in which one embodiment of the invention may be implemented. The present invention may be performed in a variety of systems and combinations of systems, made up of functional components, such as the functional components described with reference to a computer system 400 and may be communicatively connected to a network, such as network 402.

Computer system 400 includes a bus 422 or other communication device for communicating information within computer system 400, and at least one hardware processing device, such as processor 412, coupled to bus 422 for processing information. Bus 422 preferably includes low-latency and higher latency paths that are connected by bridges and adapters and controlled within computer system 400 by multiple bus controllers. When implemented as a server or node, computer system 400 may include multiple processors designed to improve network servicing power.

Processor 412 may be at least one general-purpose processor that, during normal operation, processes data under the control of software 450, which may include at least one of application software, an operating system, middleware, and other code and computer executable programs accessible from a dynamic storage device such as random access memory (RAM) 414, a static storage device such as Read Only Memory (ROM) 416, a data storage device, such as mass storage device 418, or other data storage medium. Software 450 may include, but is not limited to, code, applications, protocols, interfaces, and processes for controlling one or more systems within a network including, but not limited to, an adapter, a switch, a server, a cluster system, and a grid environment.

Computer system 400 may communicate with a remote computer, such as server 440, or a remote client. In one example, server 440 may be connected to computer system 400 through any type of network, such as network 402, through a communication interface, such as network interface 432, or over a network link that may be connected, for example, to network 402.

In the example, multiple systems within a network environment may be communicatively connected via network 402, which is the medium used to provide communications links between various devices and computer systems communicatively connected. Network 402 may include permanent connections such as wire or fiber optics cables and temporary connections made through telephone connections and wireless transmission connections, for example, and may include routers, switches, gateways and other hardware to enable a communication channel between the systems connected via network 402. Network 402 may represent one or more of packet-switching based networks, telephony based networks, broadcast television networks, local area and wire area networks, public networks, and restricted networks.

Network 402 and the systems communicatively connected to computer 400 via network 402 may implement one or more layers of one or more types of network protocol stacks which may include one or more of a physical layer, a link layer, a network layer, a transport layer, a presentation layer, and an application layer. For example, network 402 may implement one or more of the Transmission Control Protocol/Internet Protocol (TCP/IP) protocol stack or an Open Systems Interconnection (OSI) protocol stack. In addition, for example, network 402 may represent the worldwide collection of networks and gateways that use the TCP/IP suite of protocols to communicate with one another. Network 402 may implement a secure HTTP protocol layer or other security protocol for securing communications between systems.

In the example, network interface 432 includes an adapter 434 for connecting computer system 400 to network 402 through a link and for communicatively connecting computer system 400 to server 440 or other computing systems via network 402. Although not depicted, network interface 432 may include additional software, such as device drivers, additional hardware and other controllers that enable communication. When implemented as a server, computer system 400 may include multiple communication interfaces accessible via multiple peripheral component interconnect (PCI) bus bridges connected to an input/output controller, for example. In this manner, computer system 400 allows connections to multiple clients via multiple separate ports and each port may also support multiple connections to multiple clients.

In one embodiment, the operations performed by processor 412 may control the operations of flowchart of FIGS. 5-10 and other operations described herein. Operations performed by processor 412 may be requested by software 450 or other code or the steps of one embodiment of the invention might be performed by specific hardware components that contain hardwired logic for performing the steps, or by any combination of programmed computer components and custom hardware components. In one embodiment, one or more components of computer system 400, or other components, which may be integrated into one or more components of computer system 400, may contain hardwired logic for performing the operations of flowcharts in FIGS. 5-10.

In addition, computer system 400 may include multiple peripheral components that facilitate input and output. These peripheral components are connected to multiple controllers, adapters, and expansion slots, such as input/output (I/O) interface 426, coupled to one of the multiple levels of bus 422. For example, input device 424 may include, for example, a microphone, a video capture device, an image scanning system, a keyboard, a mouse, or other input peripheral device, communicatively enabled on bus 422 via I/O interface 426 controlling inputs. In addition, for example, output device 420 communicatively enabled on bus 422 via I/O interface 426 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 4, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
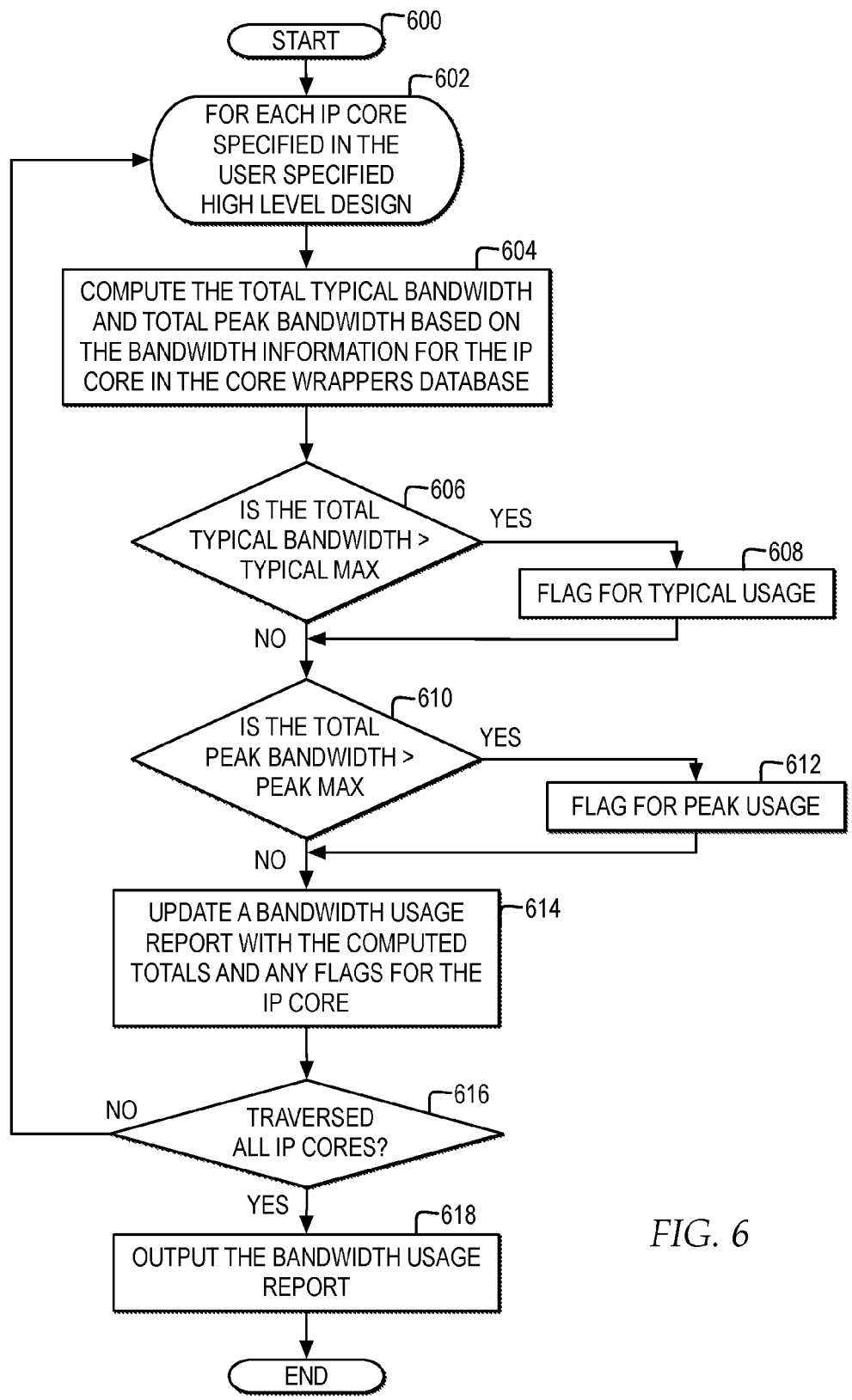
FIG. 6 illustrates one example of a high level logic flowchart of a process and program for automatically generating a bandwidth usage report for an information specification based on a user specified high level design.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

FIG. 4 illustrates one example of a block diagram of an integrated circuit that functions as a customized SOC with multiple cores. In one example, processor 412 may represent a SOC. In another example, computer system 400, and the blocks described in computer system 400, may be implemented using one or more integrated circuit devices and may function as an SOC. In one example, one or more of the blocks of computer system 400 may be implemented as integrated into an SOC, such as customized SOC 150 or customized SOC 300. One of ordinary skill in the art will appreciate that the invention should not be limited to use within a particular design or end use of an integrated circuit. Integrated circuits may be designed and fabricated using one or more computer data files, which may also be referred to as hardware definition programs, which define the layout of the circuit arrangements on the devices. Hardware definition programs may be generated by integrated design service 102, based on user specified high level design 112, and then used during manufacturing to create layout masks to define the circuit arrangements to be applied to a semiconductor wafer when fabricating a SOC.

Figure 5:
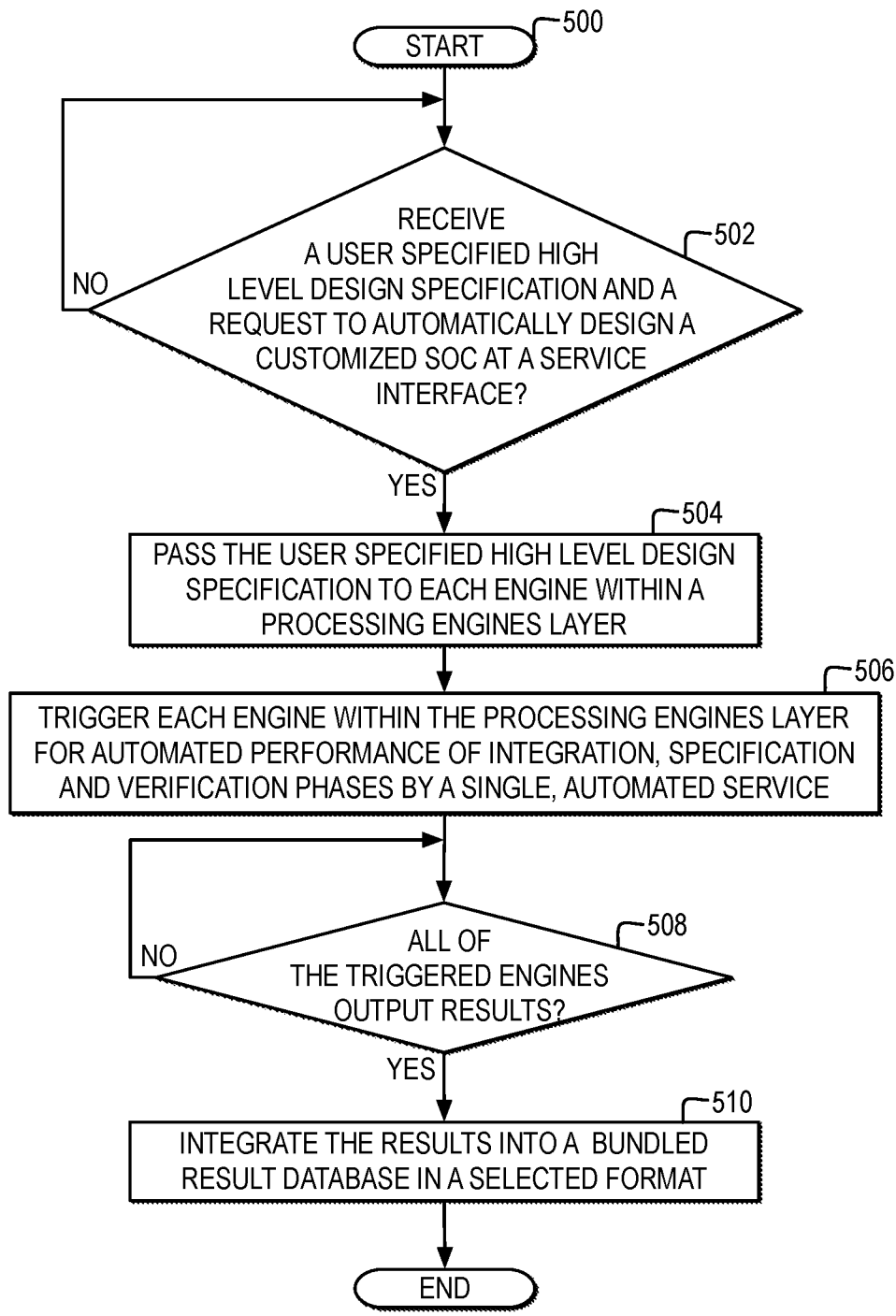
FIG. 5 illustrates one example of a high level logic flowchart of a process and program for automating SOC customized design integration, specification, and verification through a single, integrated service.

FIG. 5 illustrates one example of a high level logic flowchart of a process and program for automating SOC customized design integration, specification, and verification through a single, integrated service. In one example, the process and program start at block 500 and thereafter proceed to block 502. Block 502 illustrates a determination whether an integrated design service receives a user specified high level design specification and a request to automatically design a customized SOC at a service interface. At block 502, if an integrated design service receives a user specified high level design specification and a request to automatically design a customized SOC at a service interface, then the process passes to block 504. Block 504 illustrates passing the user specified high level design specification to each engine in a processing engines layer. Next, block 506 illustrates triggering each engine within the processing engines layer for automated performance of integration, specification, and verification phases by a single, automated service. Thereafter, block 508 illustrates a determination whether all of the triggered engines in the processing engines layer have output results. At block 508, if all of the triggered engines have output results, then the process passes to block 510. Block 510 illustrates integrating the results into a bundled result database in a selected format, and the process ends.

FIG. 6 illustrates one example of a high level logic flowchart of a process and program for automatically generating a bandwidth usage report for an information specification based on a user specified high level design. In one example, the process starts at block 600 and thereafter proceeds to block 602. Block 602 illustrates a process performed for each IP core in the user specified high level design, proceeding to block 604. Block 604 illustrates computing, for an IP core, a total typical bandwidth and total peak bandwidth based on bandwidth information about the IP core available in a core wrappers database. Next, block 606 illustrates a determination whether the total typical bandwidth is greater than the typical max. At block 606, if the total typical bandwidth is not greater than the typical max, then the process passes to block 610. Returning to block 606, if the total typical bandwidth is greater than the typical max, then the process passes to block 608. Block 608 illustrates flagging the typical usage in a bandwidth report file, and the process passes to block 610.

Block 610 illustrates a determination whether the total peak bandwidth is greater than the peak max. At block 610, if the total peak bandwidth is not greater than the peak max, then the process passes to block 614. At block 610, if the total peak bandwidth is greater than the peak max, then the process passes to block 612. Block 612 illustrates flagging the peak usage in a bandwidth report file, and the process passes to block 614.

Block 614 illustrates updating a bandwidth usage report with the computed totals and any flags for the IP core. Next, block 616 illustrates a determination whether all the IP cores in the user specified high level design have been traversed. At block 616, if not all IP cores have been traversed, the process returns to block 602. At block 616, if all IP cores have been traversed, then the process passes to block 618. Block 618 illustrates outputting the bandwidth usage report, and the process ends.

Figure 7:
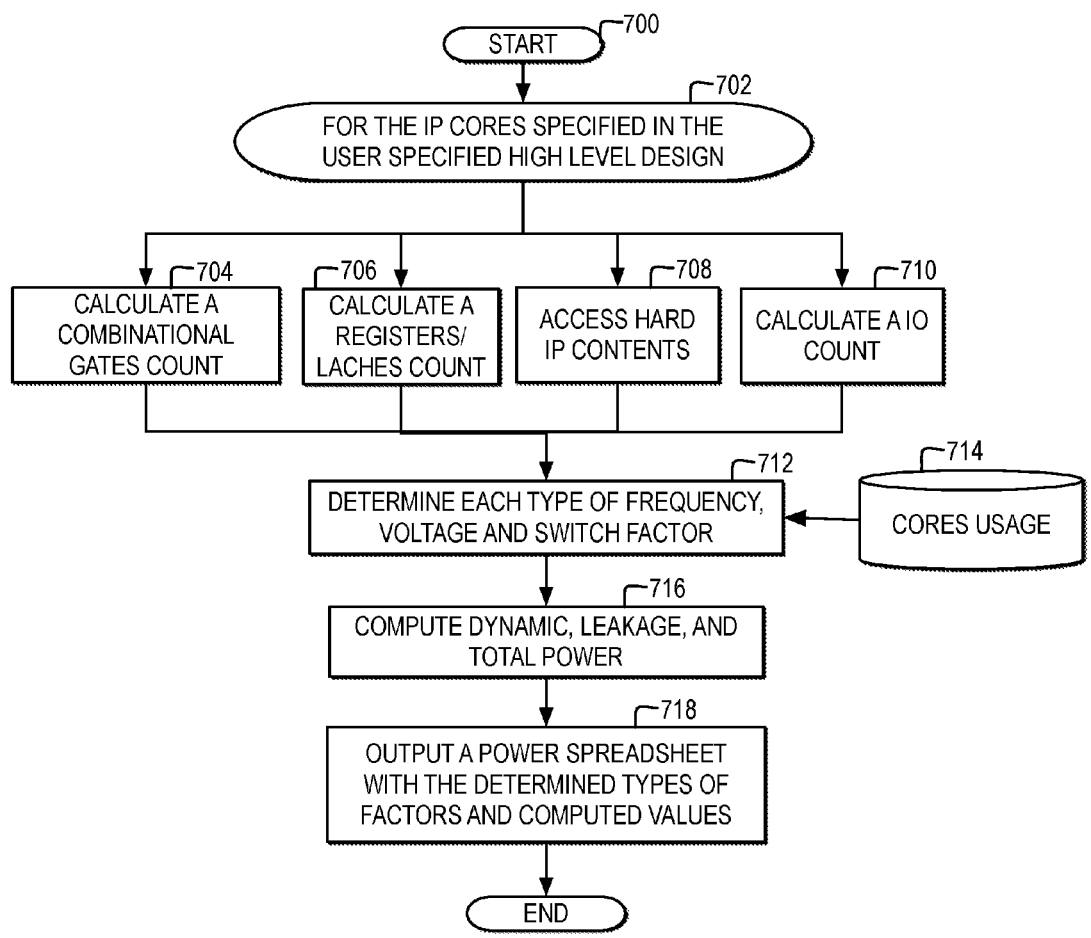
FIG. 7 illustrates one example of a high level logic flowchart of a process and program for automatically generating a power spreadsheet for a user specified high level design.

FIG. 7 illustrates one example of a high level logic flowchart of a process and program for automatically generating a power spreadsheet for a user specified high level design. In one example, the process starts at block 700 and thereafter proceeds to block 702. Block 702 illustrates a process performed for all the IP cores specified in the user specified high level design, proceeding to blocks 704, 706, 708, and 710. Block 704 illustrates calculating a combinational gate count for the IP cores based on metadata for the IP cores in the core wrappers database, block 706 illustrates calculating a registers and laches count for the IP cores based on metadata for the IP cores in the core wrappers database, block 708 illustrates access hard IP contents for the IP cores based on metadata for the IP cores in the core wrappers database, and block 710 illustrates calculating an input/output (I/O) count for the IP cores based on metadata for the IP cores in the core wrappers database. Next, block 712 illustrates determining, using a cores usage database 714 and the combinational gates count, registers and laches count, hard IP contents, and I/O count, each type of frequency, voltage and switch factor. In one example, cores usage database 714 may include information about how the cores will be used in a particular SOC. In one example, cores usage database 714 may include power related information for each of the cores specified in the user specified high level design, such as input/output ports and average power consumption. For example, a core may be operable at 1 to 2 GHz, however, if the maximum frequency for a SOC specified in cores usage database 714 is 1.4 GHz, then the frequency used to calculate the power for the SOC is 1.4 GHz. Next, block 716 illustrates computing, based on each type of frequency, voltage, and switch factor, the dynamic power and leakage power, which are summed to calculate the total power. Thereafter, block 718 illustrates outputting a power spreadsheet with the power estimation analysis including the determined types of factors and computed values, and the process ends.

Figure 8:
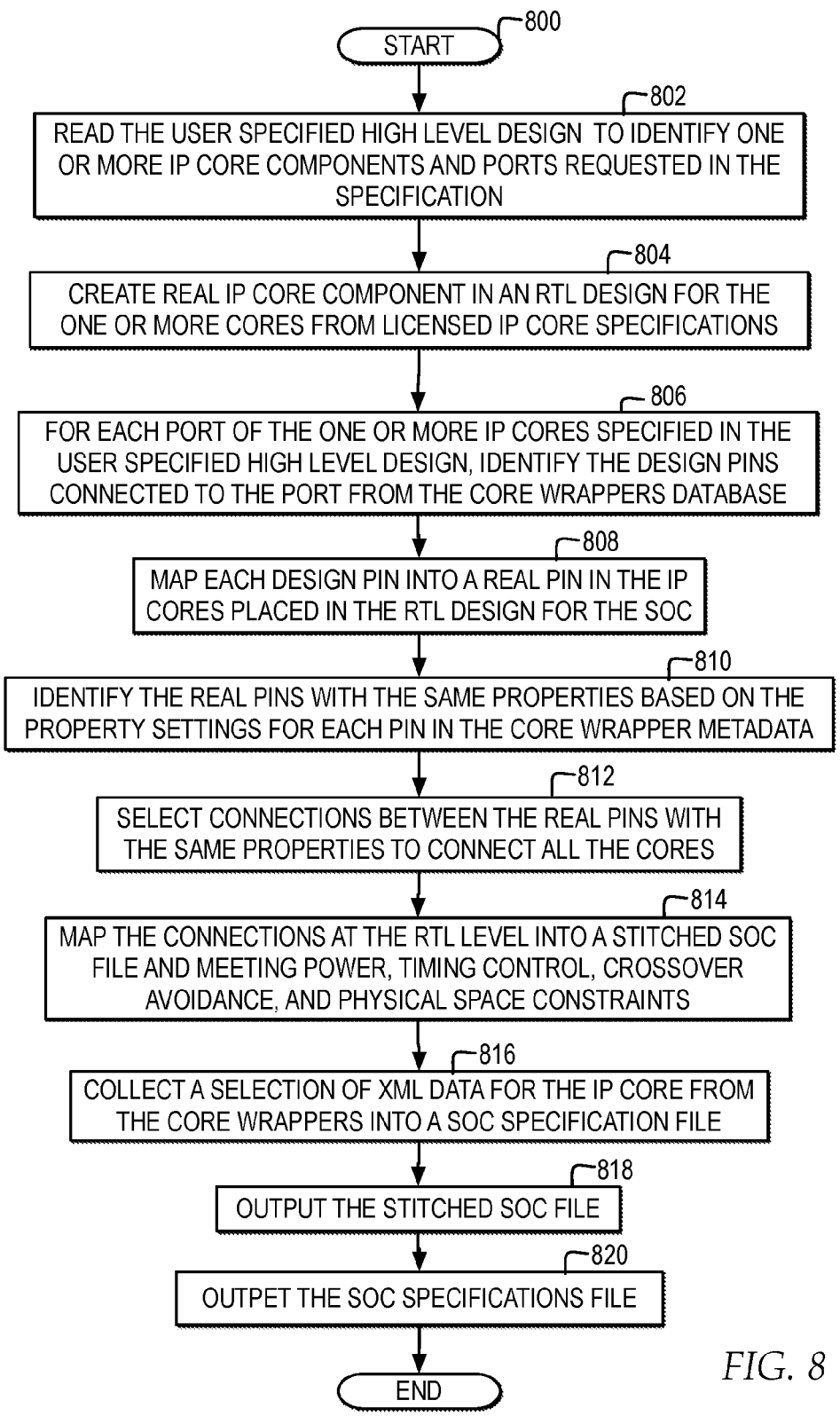
FIG. 8 illustrates one example of a high level logic flowchart of a process and program for automatically generating connections for the stitching between pins of cores specified in a user specified high level design.

FIG. 8 illustrates one example of a high level logic flowchart of a process and program for automatically generating connections for the stitching between pins of cores specified in a user specified high level design. In one example, the process starts at block 800 and thereafter proceeds to block 802. Block 802 illustrates reading the user specified high level design to identify one or more IP core components and ports requested in the specification. Next, block 804 illustrates creating real IP core components in an RTL design for the one or more cores from licensed IP core specifications for each IP core specified in the user specified high level design. Block 806 illustrates, for each port of the one or more IP cores specified in the user specified high level design, identifying the design pins connected to the port from the core wrappers database. Next, block 808 illustrates mapping each design pin into a real pin in the IP cores placed in the RTL design for the SOC. Thereafter, block 810 illustrates identifying real pins with the same properties based on the property settings for each pin in the core wrapper metadata. Next, block 812 illustrates selecting connections between the real pins with the same properties to connect all the cores. Thereafter, block 814 illustrates mapping the connections at the RTL level into a stitched SOC file, where the mapping also meets power, timing control, crossover avoidance, and physical space constraints. Next, block 816 illustrates collecting a selection of XML, data for the IP core from the core wrappers into a SOC specification file. Thereafter, block 818 illustrates outputting the stitched SOC file. Next, block 820 illustrates outputting the SOC specifications file, and the process ends.

Figure 9:
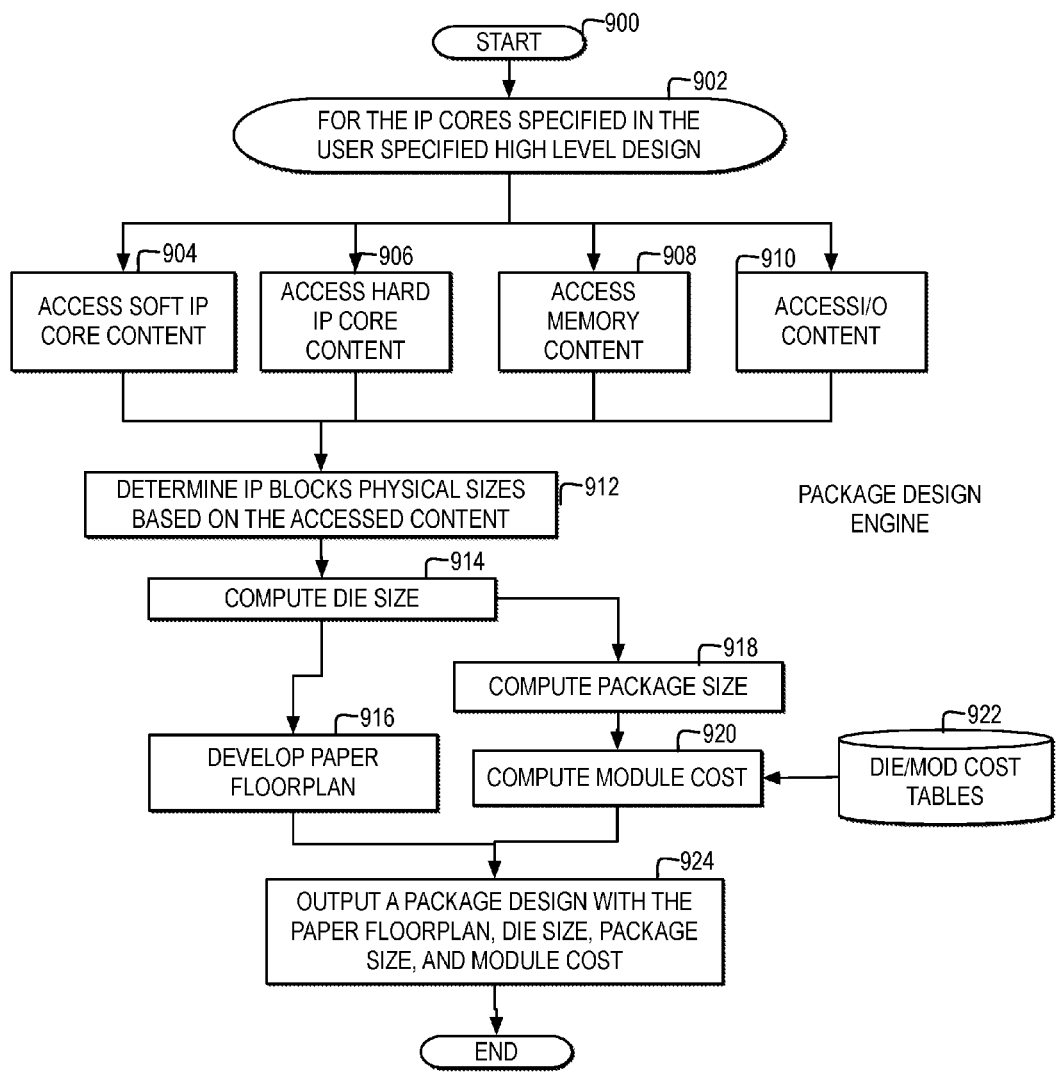
FIG. 9 illustrates one example of a high level logic flowchart of a process and program for automatically specifying a package design for a customized SOC based on a user specified high level design.

FIG. 9 illustrates one example of a high level logic flowchart of a process and program for automatically specifying a package design for a customized SOC based on a user specified high level design. In one example, the process starts at block 900 and thereafter proceeds to block 902. Block 902 illustrates a process performed for all the IP cores specified in the user specified high level design, proceeding to blocks 904, 906, 908, and 910, for accessing one or more physical component characteristics of each of the IP cores specified in the user specified high level design. Block 904 illustrates accessing soft IP core content for any soft IP cores specified in the user specified high level design, block 906 illustrates accessing hard IP core content from the core wrappers database for any hard IP cores specified in the user specified high level design, block 908 illustrates accessing memory content from the core wrappers database for one or more IP cores specified in the user specified high level design, and block 910 illustrates accessing I/O content from the core wrappers database for one or more IP cores specified in the user specified high level design. In one example, soft IP core content may represent synthesizable RTL, delivered in a hardware description language. In one example, hard IP core content may represent a low-level, physical description, which may be delivered in a transistor-layout format.

Next, block 912 illustrates determine IP block physical sizes for the accessed content, which may include accessing a package design database that provides additional information for determining physical sizes of each of the types of content. Thereafter, block 914 illustrates computing a die size for each of the physical IP blocks, and thereafter proceeds to block 916 and block 918. Block 916 illustrated developing a paper floorplan for the customized SOC based on the user specified high level design. Block 918 illustrates computing a package size for a package to include the SOC and one or more additional external devices or other chips. In one example, a package database may be accessed that includes predetermined packages, of specific sizes, and specifications for the size and type of SOC each package is configured to handle, along with the configuration for other external devices or other chips. Next, block 920 illustrates computing a module cost for the SOC manufactured for implementation on a package, based on costs for the calculated die size and the calculated package size specified in die and module cost tables 922. Thereafter, block 924 illustrates outputting a package design with the paper floorplan, die size, package size, and module cost, and the process ends.

Figure 10:
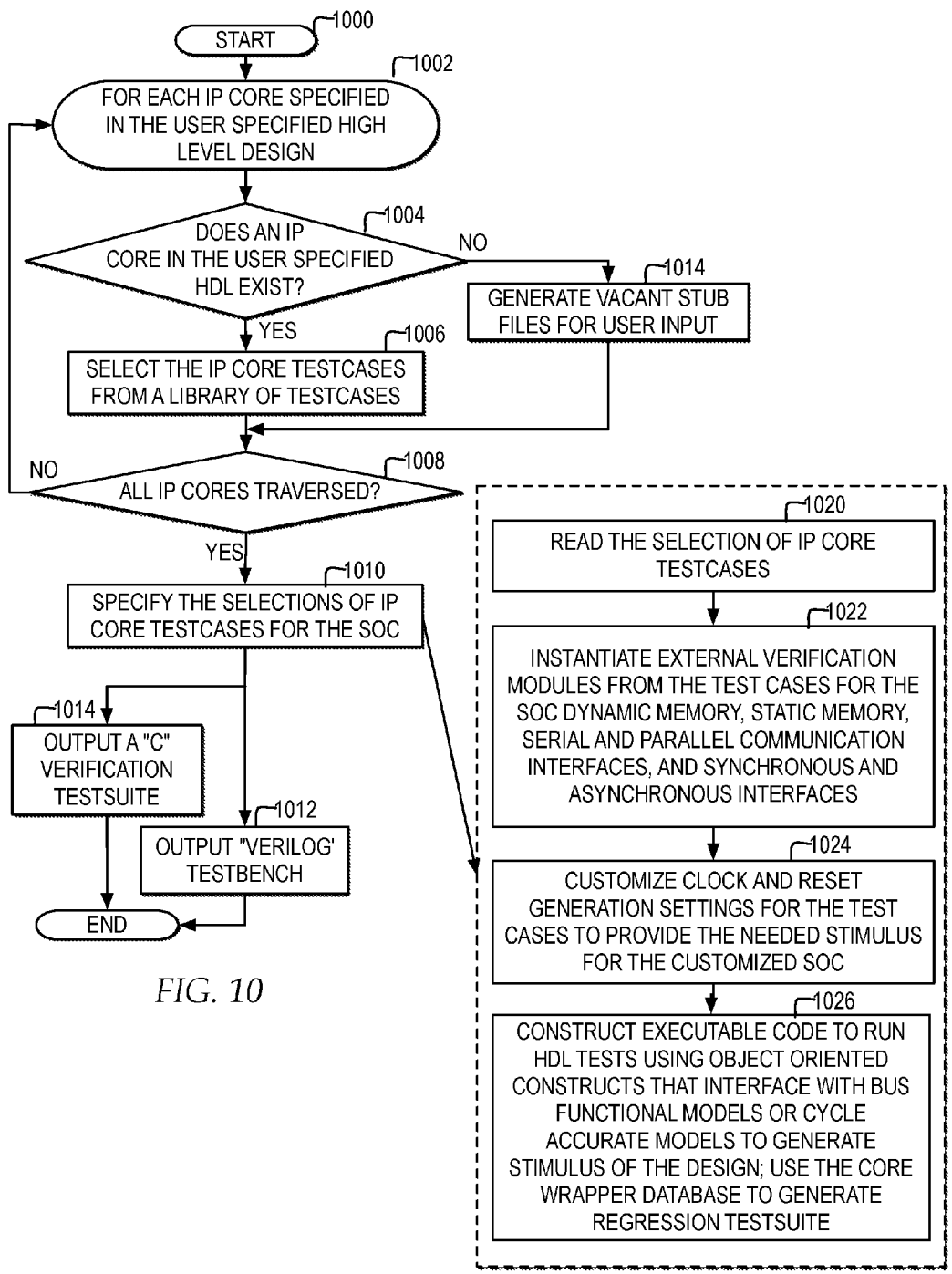
FIG. 10 illustrates one example of a high level logic flowchart of a process and program for automatically generating a verification testbench for a user specified high level design.

FIG. 10 illustrates one example of a high level logic flowchart of a process and program for automatically generating a verification testbench for a user specified high level design. In one example, the process starts at 1000 and thereafter proceeds to block 1002. Block 1002 illustrates a process performed for each IP core in specified in the user specified high level design, and the process proceeds at block 1004. Block 1004 illustrates a determination whether an identified IP core specified in the user specified high level design exists in a library of testcases. At block 1004, if the IP core exists in the library of testcases, then the process passes to block 1006. Block 1006 illustrates selecting one or more IP core testcases specified for the IP core from a library of testcases. Next, block 1008 illustrates a determination whether all the IP cores specified in the user specified high level design have been traversed. At block 1008, if all the IP cores specified in the user specified high level design have not been traversed, then the process returns to block 1002.

Returning to block 1004, if the IP core does not exist in the library of testcases, then the process passes to block 1016. Block 1016 illustrates generating a vacant stub file for user input of test cases for the particular IP core, and the process passes to block 1008. In one example, a user may be prompted, at the time the vacant stub file is created, to input testcases for a particular IP core into the vacant stub file. In another example, the user may be prompted at a later time to input testcases for a particular IP core into the vacant stub file.

At block 1008, if all the IP cores specified in the user specified high level design have been traversed, then the process passes to block 1010. Block 1010 illustrates specifying the selections of IP core testcases for the SOC, and the process passes to blocks 1012 and 1014. In one example, block 1010 may call one or more additional processes for specifying the selections of IP core testcases for the SOC, such as calling block 1020. Block 1020 illustrates reading the selection of IP core testcases. Next, block 1022 illustrates instantiating external verification modules from the test cases for the customized SOC dynamic memory, static memory, serial and parallel communication interfaces, and synchronous and asynchronous interfaces. Next, block 1024 illustrates customizing clock and reset generation settings for the test cases to provide the needed stimulus for the customized SOC. Thereafter, block 1026 illustrates constructing executable code to run HDL tests using object oriented constructs that interface with bus functional modules or cycle accurate modules to generate a stimulus of the design and using the core wrapper database or a design database to generate regression testsuites for output as a verification testsuite.

Next, block 1014 illustrates outputting a verification testsuite in the C programming language from among the testcases selected for all the IP cores and block 1012 illustrates outputting an HDL format testbench, such as a testbench in Verilog, from among the testcases selected for all the IP cores. In one example, a verification testsuite in the C programming language may include a collection of testcases for testing a simulation program to show that it has a set of behaviors on the SOC. In one example, an HDL testbench may include a collection of testcases for verifying the correctness of a design of a simulation program functioning on the SOC. In one example, the testbench is TOS/STE compatible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method, comprising:
   a computer system receiving, by a single integrated service, a user specified high level design selecting a plurality of IP cores for placement in a customized system on chip;
   the computer system automatically performing, by the single integrated service, each of a design integration phase, specification phase, and verification phase for the user specified high level design to generate an integration file specifying stitching between a plurality of pins of each of the plurality of IP cores, a specification file specifying one or more characteristics of the customized system on a chip based on the user specified high level design, and a verification testbench for verification of the plurality of IP cores selected in the user specified high level design;
   the computer system performing the integration phase by identifying, for each of the plurality of IP cores, a separate IP core component and at least one separate port;
   the computer system creating, for each separate IP core component, a separate real IP core component in a register transfer level design;
   the computer system identifying, for each at least one separate port, the plurality of pins each connected to the at least one separate port;
   the computer system mapping each pin of the plurality of pins into a separate real pin of a plurality of real pins within one of the separate real IP core component in the register transfer level design;
   the computer system identifying a selection of at least two real pins from among the plurality of design pins with a same property based on a separate property setting for each of the plurality of pins specified in a core wrappers database accessible to the single integrated service;
   the computer system selecting a separate connection of a plurality of connections between the selection of the at least one real pins with the same property to connect the plurality of IP cores;
   the computer system mapping each separate connection into the register transfer level design; and the computer system generating the integration file with the register transfer level design specifying the stitching between the plurality of pins of each of the plurality of IP cores.

2. The method according to claim 1, further comprising:
the computer system integrating the integration file, the specification file, and the verification testbench into a bundled result database in a selected format.

3. The method according to claim 1, further comprising:
the computer system performing the specification phase by computing, for each of the plurality of cores, a total typical bandwidth and a total peak bandwidth, based on a selection of bandwidth characteristics specified for the plurality of IP cores in a core wrappers database accessible to the single integrated service;
the computer system, responsive to detecting the total typical bandwidth is greater than a typical maximum bandwidth for a bus of the customized system on chip, for a particular core of the plurality of cores, flagging the particular core for typical usage limits;
the computer system, responsive to detecting the total peak bandwidth is greater than a peak maximum bandwidth for a bus of the customized system on chip, for the particular core of the plurality of cores, flagging the particular core for peak usage limits;
the computer system updating a bandwidth usage report with the typical usage limits and the peak usage limits; and
the computer system outputting the bandwidth usage report for specifying one or more bandwidth limits as the one or more characteristics of the customized system on chip for the specification file.

4. The method according to claim 1, further comprising:
the computer system accessing a core wrappers database identifying specifications of one or more gates, one or more registers, and one or more I/O interfaces for each of the plurality of IP cores;
the computer system for calculating a combinational gates count by summing the one or more gates for each of the plurality of IP cores;
the computer system for calculating a registers count by summing the one or more registers for each of the plurality of IP cores;
the computer system for calculating an I/O count by summing the one or more I/O interfaces for each of the plurality of IP cores;
the computer system for determining each of a frequency factor, a voltage factor, and a switch factor based on the combinational gates count, the registers count, the I/O count, and at least one power limit for the customized system on chip;
the computer system for computing, based on the frequency factor, voltage factor, and switch factor, an estimated dynamic power for the customized system on chip and an estimated leakage power for the customized system on chip, a total power estimated from a sum of the estimated dynamic power and the estimated leakage power; and
the computer system outputting a power spreadsheet specifying each of the frequency factor, the voltage factor, the switch factor, the estimated dynamic power, the estimated leakage power, and the total power as the one or more characteristics of the customized system on chip for the specification file.

5. The method according to claim 1, further comprising:
the computer system automatically performing, by the single integrated service, a package design phase for the user specified high level design to generate a package design;
the computer system automatically performing the package design phase by accessing a plurality of physical characteristics of the plurality of IP cores from a core wrappers database accessible to the single integrated service;
the computer system determining, for each of the plurality of IP cores, a separate IP block physical size based on the plurality of physical characteristics;
the computer system computing a die size required for the separate IP block physical size for each of the plurality of IP cores;
the computer system developing a floor plan for placing the plurality of IP cores in a preexisting package interface selected for the die size, the floor plan configured for each separate IP block physical size;
the computer system computing a package size based on the die size and each separate IP block physical size;
the computer system computing a module cost based on a cost of the die size and a cost of the package size; and
the computer system outputting the package design comprising the floor plan, the die size, the package size, and the module cost.

6. The method according claim 1, comprising:
the computer system performing the verification phase by selecting one or more testcases specified for each of the plurality of IP cores from among a plurality of testcases specified by IP core identifier in a library of testcases accessible to the single integrated service;
the computer system instantiating one or more external verification modules from the selected one or more testcases for testing one or more interfaces of the plurality of IP cores;
the computer system customizing clock and reset generation settings for the selected one or more testcases to provide a needed stimulus for testing the customized system on chip;
the computer system constructing executable code to run one or more hardware description language tests from among the selected one or more testcases using one or more object oriented constructs that interface with bus functional models to generate a stimulus of the design; and
the computer system for outputting the verification testbench comprising the one or more external verification modules, the customized clock and reset generation settings, and the executable code for verification of the plurality of IP cores.

7. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
program instructions to receive, by a single integrated service, a user specified high level design selecting a plurality of IP cores for placement in a customized system on a chip;
program instructions to automatically perform, by the single integrated service, each of a design integration phase, specification phase, and verification phase for the user specified high level design to generate an integration file specifying stitching between a plurality of pins of each of the plurality of IP cores, a specification file specifying one or more characteristics of the customized system on a chip based on the user specified high level design, and a verification testbench for verification of the plurality of IP cores selected in the user specified high level design;

program instructions to perform the integration phase by identifying, for each of the plurality of IP cores, a separate IP core component and at least one separate port;

program instructions to create, for each separate IP core component, a separate real IP core component in a register transfer level design;

program instructions to identify, for each at least one separate port, the plurality of pins each connected to the at least one separate port;

program instructions to map each pin of the plurality of pins into a separate real pin of a plurality of real pins within one of the separate real IP core component in the register transfer level design;

program instructions to identify a selection of at least two real pins from among the plurality of design pins with a same property based on a separate property setting for each of the plurality of pins specified in a core wrappers database accessible to the single integrated service;

program instructions to select a separate connection of a plurality of connections between the selection of the at least one real pins with the same property to connect the plurality of IP cores;

program instructions to map each separate connection into the register transfer level design; and program instructions to generate the integration file with the register transfer level design specifying the stitching between the plurality of pins of each of the plurality of IP cores.

8. The computer system according to claim 7, the stored program instructions further comprising:

program instructions to integrate the integration file, the specification file, and the verification testbench into a bundled result database in a selected format.

9. The computer system according to claim 7, the stored program instructions further comprising:

program instructions to perform the specification phase by computing, for each of the plurality of cores, a total typical bandwidth and a total peak bandwidth, based on a selection of bandwidth characteristics specified for the plurality of IP cores in a core wrappers database accessible to the single integrated service;

program instructions, responsive to detecting the total typical bandwidth is greater than a typical maximum bandwidth for a bus of the customized system on chip, for a particular core of the plurality of cores, to flag the particular core for typical usage limits;

program instructions, responsive to detecting the total peak bandwidth is greater than a peak maximum bandwidth for a bus of the customized system on chip, for the particular core of the plurality of cores, to flag the particular core for peak usage limits;

program instructions to update a bandwidth usage report with the typical usage limits and the peak usage limits; and program instructions to output the bandwidth usage report for specifying one or more bandwidth limits as the one or more characteristics of the customized system on chip for the specification file.

10. The computer system according to claim 7, the stored program instructions further comprising:

program instructions to access a core wrappers database identifying specifications of one or more gates, one or more registers, and one or more I/O interfaces for each of the plurality of IP cores;

program instructions to calculate a combinational gates count by summing the one or more gates for each of the plurality of IP cores;

program instructions to calculate a registers count by summing the one or more registers for each of the plurality of IP cores;

program instructions to calculate an I/O count by summing the one or more I/O interfaces for each of the plurality of IP cores;

program instructions to determine each of a frequency factor, a voltage factor, and a switch factor based on the combinational gates count, the registers count, the I/O count, and at least one power limit for the customized system on chip;

program instructions to compute, based on the frequency factor, voltage factor, and switch factor, an estimated dynamic power for the customized system on chip and an estimated leakage power for the customized system on chip, a total power estimated from a sum of the estimated dynamic power and the estimated leakage power; and program instructions to output a power spreadsheet specifying each of the frequency factor, the voltage factor, the switch factor, the estimated dynamic power, the estimated leakage power, and the total power as the one or more characteristics of the customized system on chip for the specification file.

11. The computer system according to claim 7, the stored program instructions further comprising:

program instructions to automatically perform, by the single integrated service, a package design phase for the user specified high level design to generate a package design;

program instructions to automatically perform the package design phase by accessing a plurality of physical characteristics of the plurality of IP cores from a core wrappers database accessible to the single integrated service;

program instructions to determine, for each of the plurality of IP cores, a separate IP block physical size based on the plurality of physical characteristics;

program instructions to compute a die size required for the separate IP block physical size for each of the plurality of IP cores;

program instructions to develop a floor plan for placing the plurality of IP cores in a preexisting package interface selected for the die size, the floor plan configured for each separate IP block physical size;

program instructions to compute a package size based on the die size and each separate IP block physical size;

program instructions to compute a module cost based on a cost of the die size and a cost of the package size; and program instructions to output the package design comprising the floor plan, the die size, the package size, and the module cost.

12. The computer system according to claim 7, the stored program instructions further comprising:

program instructions to perform the verification phase by selecting one or more testcases specified for each of the plurality of IP cores from among a plurality of testcases specified by IP core identifier in a library of testcases accessible to the single integrated service;

program instructions to instantiate one or more external verification modules from the selected one or more testcases for testing one or more interfaces of the plurality of IP cores;

program instructions to customize clock and reset generation settings for the selected one or more testcases to provide a needed stimulus for testing the customized system on chip;

program instructions to construct executable code to run one or more hardware description language tests from among the selected one or more testcases using one or more object oriented constructs that interface with bus functional models to generate a stimulus of the design; and program instructions to output the verification testbench comprising the one or more external verification modules, the customized clock and reset generation settings, and the executable code for verification of the plurality of IP cores.

13. A computer program product comprising one or more computer-readable storage devices and program instructions, stored on at least one of the one or more storage devices, the stored program instructions comprising:

program instructions to receive, by a single integrated service, a user specified high level design selecting a plurality of IP cores for placement in a customized system on a chip;

program instructions to automatically perform, by the single integrated service, each of a design integration phase, specification phase, and verification phase for the user specified high level design to generate an integration file specifying stitching between a plurality of pins of each of the plurality of IP cores, a specification file specifying one or more characteristics of the customized system on a chip based on the user specified high level design, and a verification testbench for verification of the plurality of IP cores selected in the user specified high level design;

program instructions to perform the integration phase by identifying, for each of the plurality of IP cores, a separate IP core component and at least one separate port;

program instructions to create, for each separate IP core component, a separate real IP core component in a register transfer level design;

program instructions to identify, for each at least one separate port, the plurality of pins each connected to the at least one separate port;

program instructions to map each pin of the plurality of pins into a separate real pin of a plurality of real pins within one of the separate real IP core component in the register transfer level design;

program instructions to identify a selection of at least two real pins from among the plurality of design pins with a same property based on a separate property setting for each of the plurality of pins specified in a core wrappers database accessible to the single integrated service;

program instructions to select a separate connection of a plurality of connections between the selection of the at least two real pins with the same property to connect the plurality of IP cores;

program instructions to map each separate connection into the register transfer level design; and program instructions to generate the integration file with the register transfer level design specifying the stitching between the plurality of pins of each of the plurality of IP cores.

14. The computer program product according to claim 13, the stored program instructions further comprising:

program instructions to integrate the integration file, the specification file, and the verification testbench into a bundled result database in a selected format.

15. The computer program product according to claim 13, the stored program instructions further comprising:

program instructions to perform the specification phase by computing, for each of the plurality of cores, a total typical bandwidth and a total peak bandwidth, based on a selection of bandwidth characteristics specified for the plurality of IP cores in a core wrappers database accessible to the single integrated service;

program instructions, responsive to detecting the total typical bandwidth is greater than a typical maximum bandwidth for a bus of the customized system on chip, for a particular core of the plurality of cores, to flag the particular core for typical usage limits;

program instructions, responsive to detecting the total peak bandwidth is greater than a peak maximum bandwidth for a bus of the customized system on chip, for the particular core of the plurality of cores, to flag the particular core for peak usage limits;

program instructions to update a bandwidth usage report with the typical usage limits and the peak usage limits; and program instructions to output the bandwidth usage report for specifying one or more bandwidth limits as the one or more characteristics of the customized system on chip for the specification file.

16. The computer program product according to claim 13, the stored program instructions further comprising:

program instructions to access a core wrappers database identifying specifications of one or more gates, one or more registers, and one or more I/O interfaces for each of the plurality of IP cores;

program instructions to calculate a combinational gates count by summing the one or more gates for each of the plurality of IP cores;

program instructions to calculate a registers count by summing the one or more registers for each of the plurality of IP cores;

program instructions to calculate an I/O count by summing the one or more I/O interfaces for each of the plurality of IP cores;

program instructions to determine each of a frequency factor, a voltage factor, and a switch factor based on the combinational gates count, the registers count, the I/O count, and at least one power limit for the customized system on chip;

program instructions to compute, based on the frequency factor, voltage factor, and switch factor, an estimated dynamic power for the customized system on chip and an estimated leakage power for the customized system on chip, a total power estimated from a sum of the estimated dynamic power and the estimated leakage power; and program instructions to output a power spreadsheet specifying each of the frequency factor, the voltage factor, the switch factor, the estimated dynamic power, the estimated leakage power, and the total power as the one or more characteristics of the customized system on chip for the specification file.

17. The computer program product according to claim 13, the stored program instructions further comprising:

program instructions to automatically perform, by the single integrated service, a package design phase for the user specified high level design to generate a package design;

program instructions to automatically perform the package design phase by accessing a plurality of physical characteristics of the plurality of IP cores from a core wrappers database accessible to the single integrated service;

program instructions to determine, for each of the plurality of IP cores, a separate IP block physical size based on the plurality of physical characteristics;

program instructions to compute a die size required for the separate IP block physical size for each of the plurality of IP cores;

program instructions to develop a floor plan for placing the plurality of IP cores in a preexisting package interface selected for the die size, the floor plan configured for each separate IP block physical size;

program instructions to compute a package size based on the die size and each separate IP block physical size;

program instructions to compute a module cost based on a cost of the die size and a cost of the package size; and program instructions to output the package design comprising the floor plan, the die size, the package size, and the module cost.

\* \* \* \* \*